(12) United States Patent
Taniguchi et al.

(10) Patent No.: US 9,179,050 B2
(45) Date of Patent: Nov. 3, 2015

(54) ELECTRONIC DEVICE WITH SLIDABLE DISPLAY SECTION

(75) Inventors: Takuo Taniguchi, Osaka (JP); Kenji Nishiwaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 396 days.

(21) Appl. No.: 13/586,978

(22) Filed: Aug. 16, 2012

(65) Prior Publication Data

US 2013/0050555 A1 Feb. 28, 2013

(30) Foreign Application Priority Data

Aug. 23, 2011 (JP) ................... 2011-181247

(51) Int. Cl.
*H04N 5/222* (2006.01)
*H04N 5/225* (2006.01)

(52) U.S. Cl.
CPC .................. *H04N 5/2252* (2013.01)

(58) Field of Classification Search
CPC ............ H04N 5/2251; H04N 5/23293; H04N 5/2252; H04M 1/0218; H04M 1/021
USPC ................ 348/333.01, 333.06, 376
See application file for complete search history.

(56) References Cited

U.S. PATENT DOCUMENTS

| 7,046,286 | B1 | 5/2006 | Kobayashi et al. |
| 2008/0239142 | A1 | 10/2008 | Suzuki |
| 2009/0096908 | A1* | 4/2009 | Amano ............ 348/333.01 |

FOREIGN PATENT DOCUMENTS

| JP | 11-088740 A | 3/1999 |
| JP | 2004-266613 A | 9/2004 |
| JP | 2005-130375 A | 5/2005 |
| JP | 2008-028759 A | 2/2008 |
| JP | 2008-244801 A | 10/2008 |

* cited by examiner

*Primary Examiner* — Twyler Haskins
*Assistant Examiner* — Quang Le
(74) *Attorney, Agent, or Firm* — Renner, Otto, Boisselle & Sklar, LLP

(57) ABSTRACT

The electronic device includes: a display section including a monitor unit having a display panel; a slide unit having a space in which the display section can be accommodated, the slide unit slidably supporting the display section; and a slide piece adjacent to the slide unit in a slide direction of the display section, the slide piece slidably supporting the display section. The display section slides between a retracted position at which the display section is accommodated in the space of the slide unit and an extended position to which the display section is pulled out from the slide unit.

12 Claims, 20 Drawing Sheets

A-A' CROSS-SECTIONAL VIEW

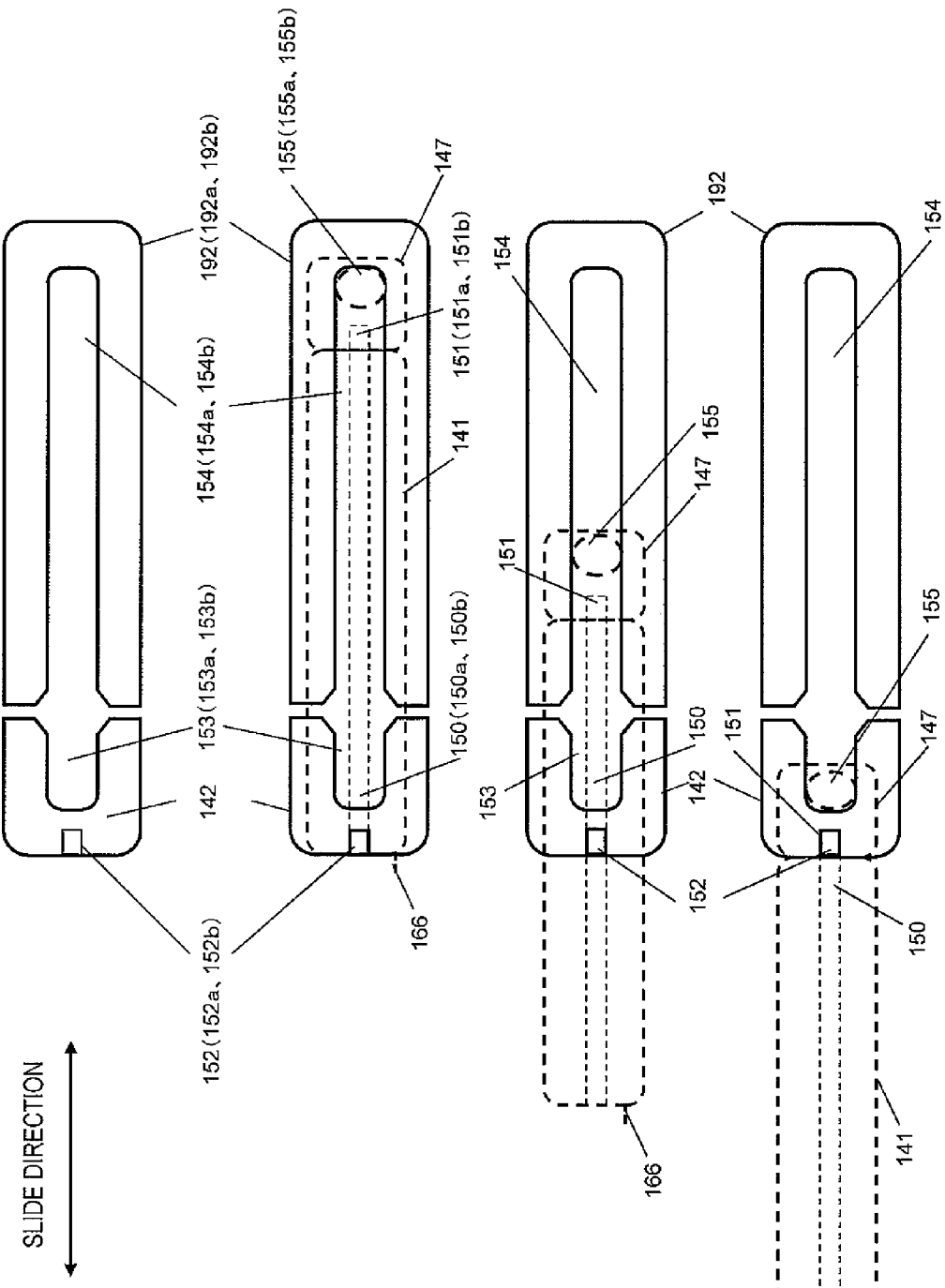

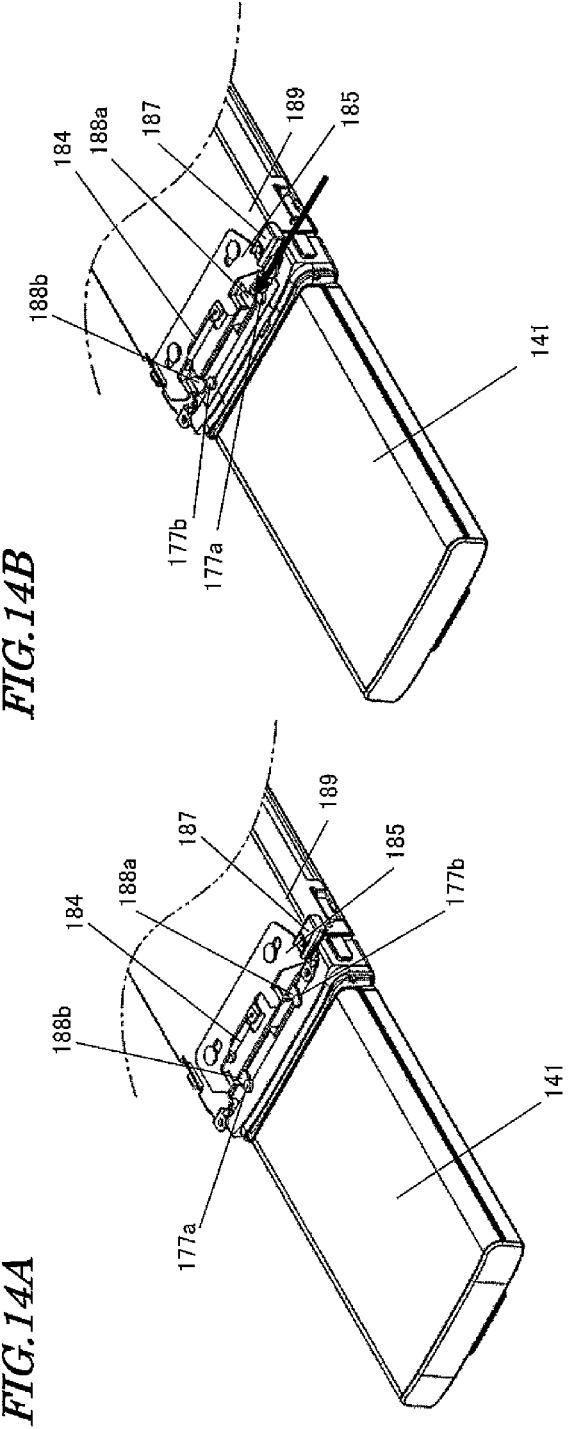
FIG.14A
FIG.14B
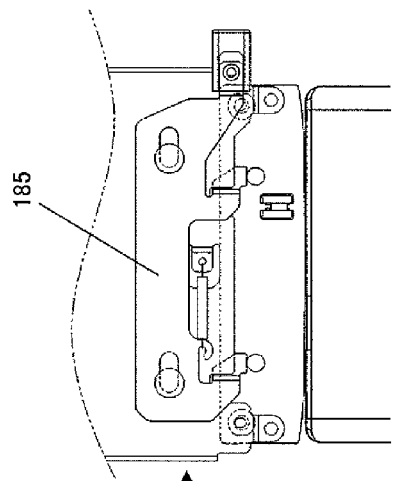
FIG.14C
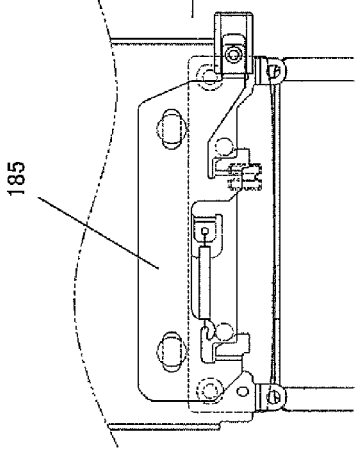
FIG.14D
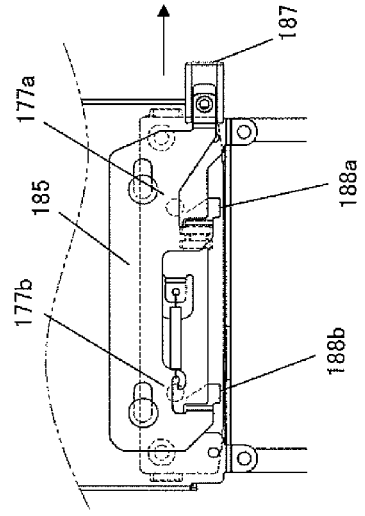
FIG.14E

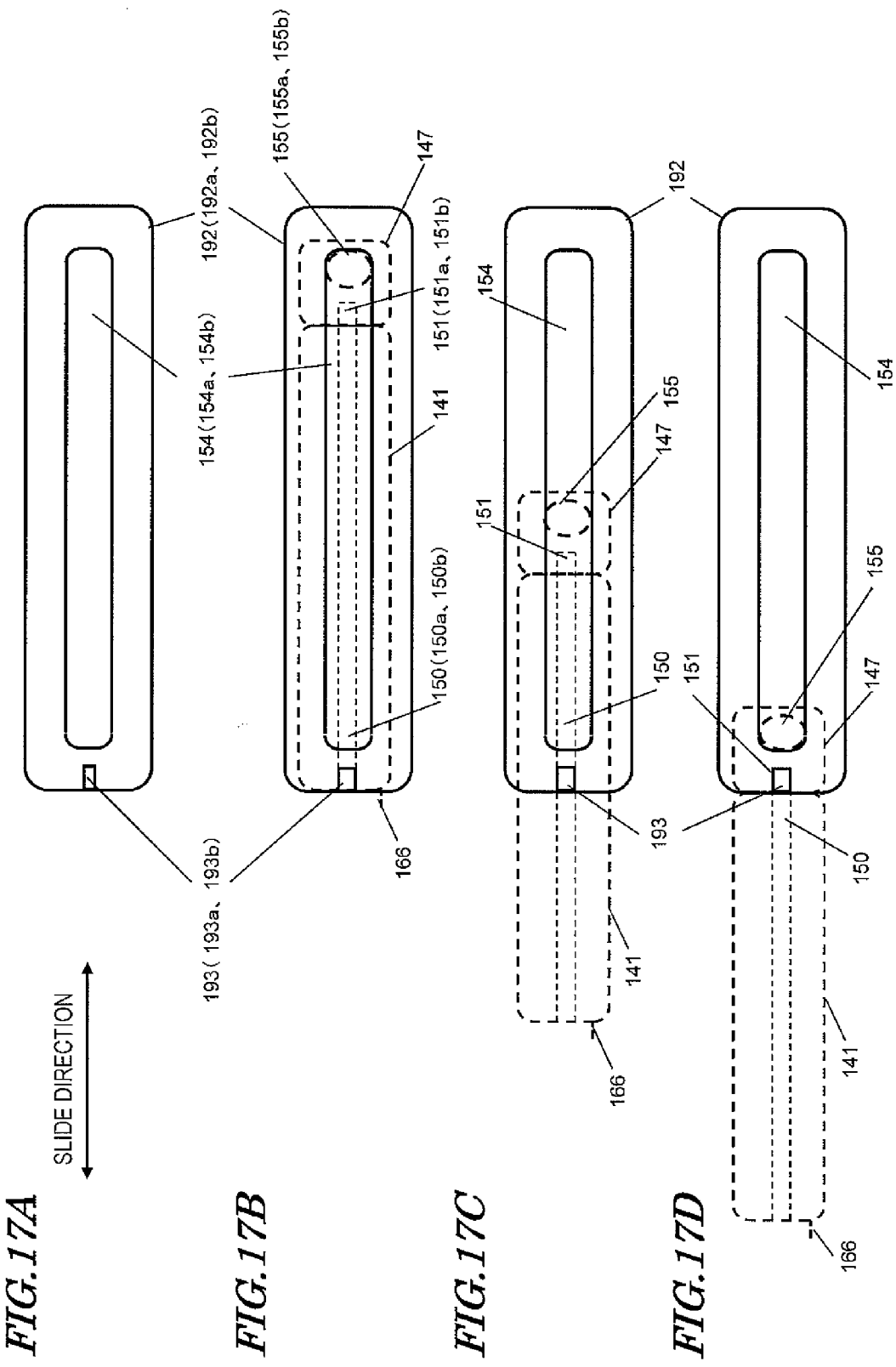

400

ELECTRONIC DEVICE WITH SLIDABLE DISPLAY SECTION

BACKGROUND

1. Technical Field

The present disclosure relates to an electronic device having a monitor unit.

2. Description of the Related Art

In the field of electronic devices, digital still cameras, digital camcorders, portable DVD players, etc., having a monitor unit including a display panel have been widespread. For example, Japanese Laid-Open Patent Publication No. 2008-244801 discloses an image capture device having a display section, which can be placed at such a position that the user can easily view the display section when in use and which can be retracted to such a position that it does not interfere with the field of view of the user and does not hinder user operations when not in use.

SUMMARY

The present disclosure provides an electronic device having a monitor unit and being easy to operate for the user.

(1) An electronic device according to the present disclosure includes: a display section including a monitor unit having a display panel; a slide unit having a space in which the display section can be accommodated, the slide unit slidably supporting the display section; and a slide piece adjacent to the slide unit in a slide direction of the display section, the slide piece slidably supporting the display section. The display section slides between a retracted position at which the display section is accommodated in the space of the slide unit and an extended position to which the display section is pulled out from the slide unit.

(2) An electronic device according to the present disclosure includes: a monitor unit having a display panel; a rotation mechanism unit provided at one end of the monitor unit; and a slide unit having a space in which the monitor unit and the rotation mechanism unit can be accommodated, the slide unit slidably supporting the monitor unit and the rotation mechanism unit. The monitor unit and the rotation mechanism unit slide between a retracted position at which the monitor unit and the rotation mechanism unit are accommodated in the space of the slide unit and an extended position to which the monitor unit and the rotation mechanism unit are pulled out from the slide unit. The monitor unit is rotatably supported by the rotation mechanism unit so that the monitor unit can rotate with respect to the rotation mechanism unit about a rotation axis that is offset from a center line of the display panel which is parallel to a slide direction of the monitor unit and the rotation mechanism unit.

According to the present disclosure, it is possible to provide an electronic device having a monitor unit and being easy to operate for the user.

BRIEF DESCRIPTION OF THE DRAWINGS

FIGS. 11A to 11D are diagrams illustrating a slide mechanism of the monitor unit 141 according to an exemplary Embodiment 1.

FIGS. 14A to 14E are diagrams illustrating a lock mechanism of the monitor unit 141 according to an exemplary Embodiment 1.

FIGS. 17A to 17D are diagrams illustrating a slide mechanism of the monitor unit 141 according to an exemplary Embodiment 2.

DETAILED DESCRIPTION

Figure 1:
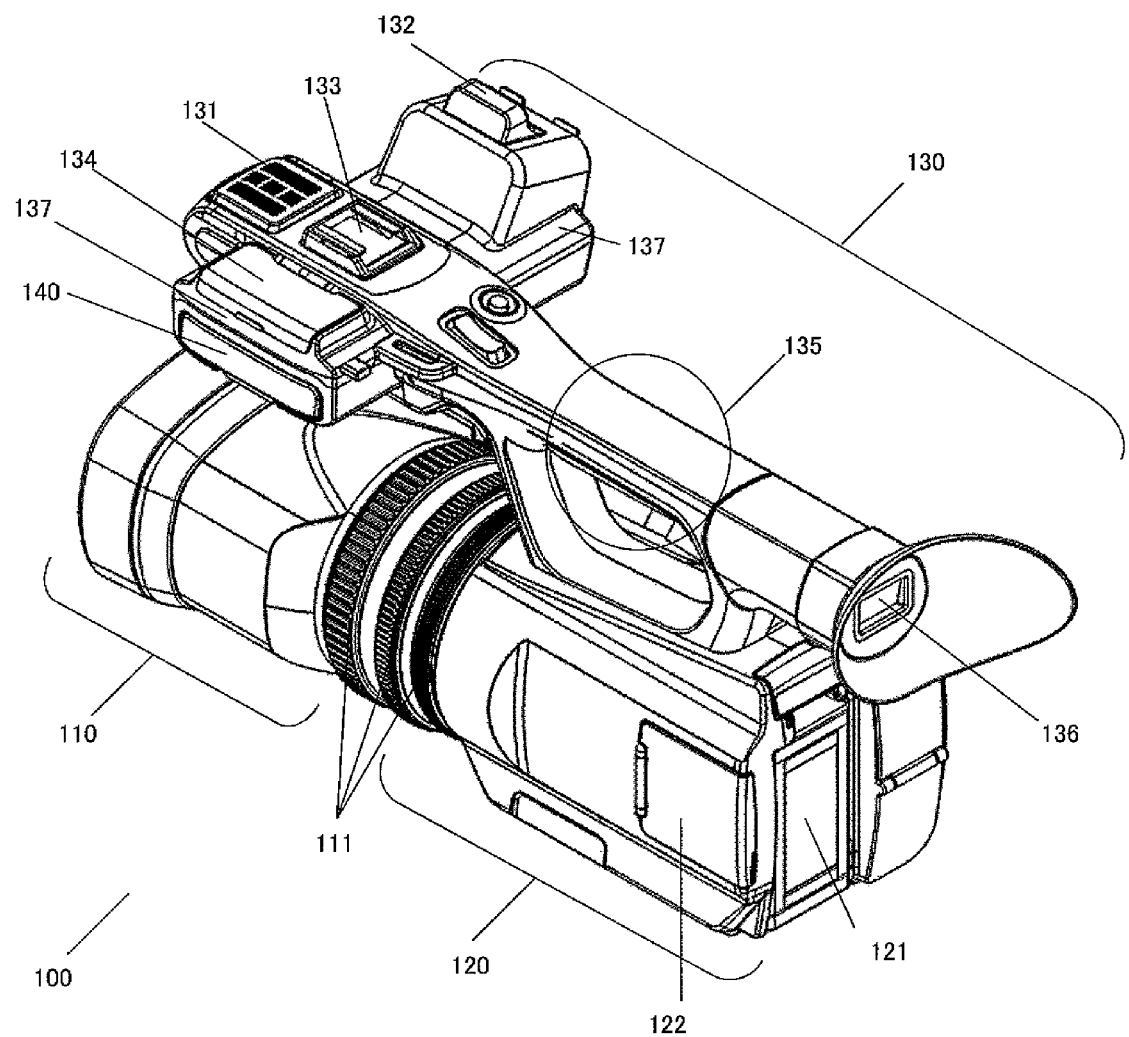
FIG. 1 is an external view of a camcorder 100 according to an exemplary Embodiment 1.

Embodiments will now be described in detail while referring to the drawings as necessary. Note however that unnecessary details may be omitted. For example, detailed description of well-known elements or redundant description on substantially the same elements may be omitted. This is for preventing the following description from being unnecessarily redundant and for the ease of understanding by a person of ordinary skill in the art. Note that the present inventors provide the accompanying drawings and the following description for sufficient understanding of the present disclosure, and they are not intended to limit the scope of the subject matter recited in the claims.

[Embodiment 1]

Embodiment 1 will now be described with reference to FIGS. 1 to 16 and FIG. 18.

[1-1. Configuration]

[1-1-1. Configuration of Camcorder]

Referring to FIG. 1, the general configuration of a camcorder 100 according to Embodiment 1 will be described. FIG. 1 is an external view of the camcorder 100.

The camcorder 100 according to Embodiment 1 includes a lens section 110, a camera body section 120, and a handle section 130.

The handle section 130 is provided above the camera body section 120. The handle section 130 includes, on the upper surface thereof, a microphone 131 for recording sound, a connection terminal 132 to which an external microphone can be connected, a shoe 133 to which an accessory can be connected, and a handle 135 that can be held by hand.

The camera body section 120 includes a grip section (not shown) on a side surface of the camcorder 100 shown in FIG. 1 that is opposite to the side surface on which a manipulation section 122 is provided and that is not shown in the figure. The user can take a video while supporting the camcorder 100 by holding the handle 135 or the grip section, depending on the video-taking circumstances.

When the user holds the grip section (not shown) by the right hand, the user can put the left hand near a manual operation ring 111 in order to support the weight of the camcorder 100. Therefore, the user can take a video while stabilizing the posture and while supporting the weight of the camcorder 100.

An EVF (electronic view finder) 136 is provided in a rear portion of the handle section 130. The monitor accommodating section 137, in which the slide monitor unit 140 can be accommodated, is provided on the lower surface of a tip portion of the handle section 130.

The slide monitor unit 140 is accommodated in the monitor accommodating section 137 so that the long side of the slide monitor unit 140 is perpendicular to the longitudinal direction of the handle section 130. Thus, it is possible to ensure a large space for placing members thereon on the upper surface of the tip portion of the handle section 130. Thus, a large number of members, such as the microphone 131, the shoe 133 and a manipulation section 134 can be placed.

Figure 2:
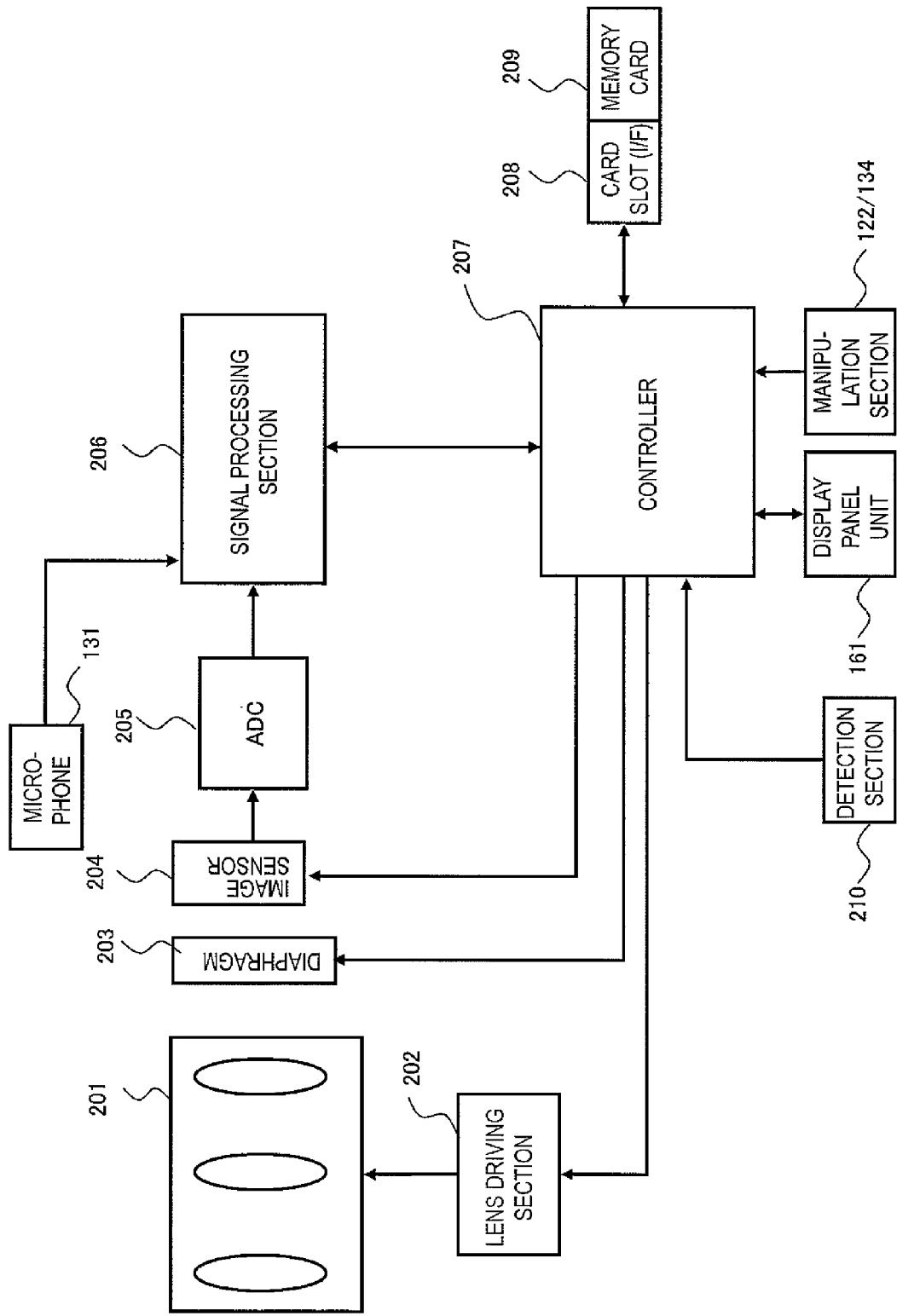
FIG. 2 is a system configuration diagram of the camcorder 100 according to an exemplary Embodiment 1.

Referring to FIGS. 1 and 2, the configuration of the lens section 110 and that of the camera body section 120 will now be described. FIG. 2 is a system configuration diagram of the camcorder 100.

The lens section 110 includes an optical system 201 having a plurality of lenses, a lens driving section 202, a diaphragm 203, and the manual operation ring 111 for manually performing zoom operations and image quality adjustments.

The camera body section 120 includes an image sensor 204, an A/D converter 205, a signal processing section 206, a controller 207, a card slot 208, and the manipulation section 122. The camera body section 120 also includes a battery 121 for supplying power to different sections of the camcorder 100.

Note that the microphone 131, the connection terminal 132, the shoe 133, the manipulation section 134 and the EVF 136 provided in the handle section 130 are electrically connected to the controller 207 in the camera body section 120. Thus, the controller 207 in the camera body section 120 can control not only electric members provided inside the camera body section 120, but also electric members provided in the handle section.

Components of the system configuration shown in FIG. 2 will now be described in detail.

The optical system 201 includes a zoom lens and a focus lens. By moving the zoom lens along the optical axis, the subject image is zoomed in or out. By moving the focus lens along the optical axis, the focus position of the subject image is adjusted.

The lens driving section 202 drives the various lenses included in the optical system 201. For example, the lens driving section 202 includes a zoom motor for driving the zoom lens, and a focus motor for driving the focus lens.

The diaphragm 203 adjusts the amount of light passing therethrough by adjusting the size of the aperture of the diaphragm 203 automatically or according to the user settings.

The image sensor 204 generates an image capture signal (analog signal) based on the subject image formed by the optical system 201. The image sensor 204 performs various operations, e.g., exposure, transfer and electronic shutter. The image sensor 204 can be implemented by a CCD image sensor or a CMOS image sensor, for example.

The A/D converter 205 converts the image capture signal (analog signal) generated by the image sensor 204 into a digital signal.

The signal processing section 206 performs various processes on the digital signal generated by the A/D converter 205. For example, the signal processing section 206 performs various processes such as gamma correction, white balance correction and defect correction on the digital signal.

For example, the signal processing section 206 compresses the image data in a compression format in conformity with the H.264 standard and the MPEG2 standard. Then, the signal processing section 206 generates image data to be displayed on a display panel unit 161 (hereinafter referred to also as a "display panel 161"), and image data to be stored on a memory card 209. The signal processing section 206 can be implemented by a DSP, or the like.

The signal processing section 206 performs various processes such as the noise removal process on the audio signal obtained by the microphone 131.

The signal processing section 206 compresses audio data in a compression format in conformity with the MPEG4 Audio standard and the AC3 standard. Then, the signal processing section 206 generates audio data to be stored on the memory card 209.

The controller 207 is a central processing unit (CPU) responsible for overall control of the camcorder 100.

The controller 207 controls the image display on the display panel 161 based on the detection results of a detection section 210. The controller 207 can be implemented by a microcomputer, or the like.

The memory card 209 can be inserted into, and ejected from, the card slot 208. The card slot 208 is an interface (I/F) capable of mechanically and electrically connecting to the memory card 209. The memory card 209 includes therein a flash memory, a ferroelectric memory, or the like, and is capable of storing data, such as image files, generated by the signal processing section 206.

The microphone 131 converts collected sound into an electric signal.

The detection section 210 detects the slide position and the rotational position of the monitor unit 141. The detection section 210 includes a slide detection sensor 182a, and a reverse rotation detection sensor 182b. The slide detection sensor 182a and the reverse rotation detection sensor 182b can be implemented by a magnetic sensor, for example.

The manipulation sections 122 and 134 collectively refer to a user interface for accepting user operations. For example, the manipulation sections 122 and 134 include cross-shaped key and a enter button for receiving operations from the user.

The display panel unit 161 can display an image (through-the-lens image) represented by the image data of the subject image which has been taken by the image sensor 204, and an image represented by the image data read out from the memory card 209.

The display panel unit 161 can also display various menu screens, etc., for making various settings of the camcorder 100.

Figure 3:
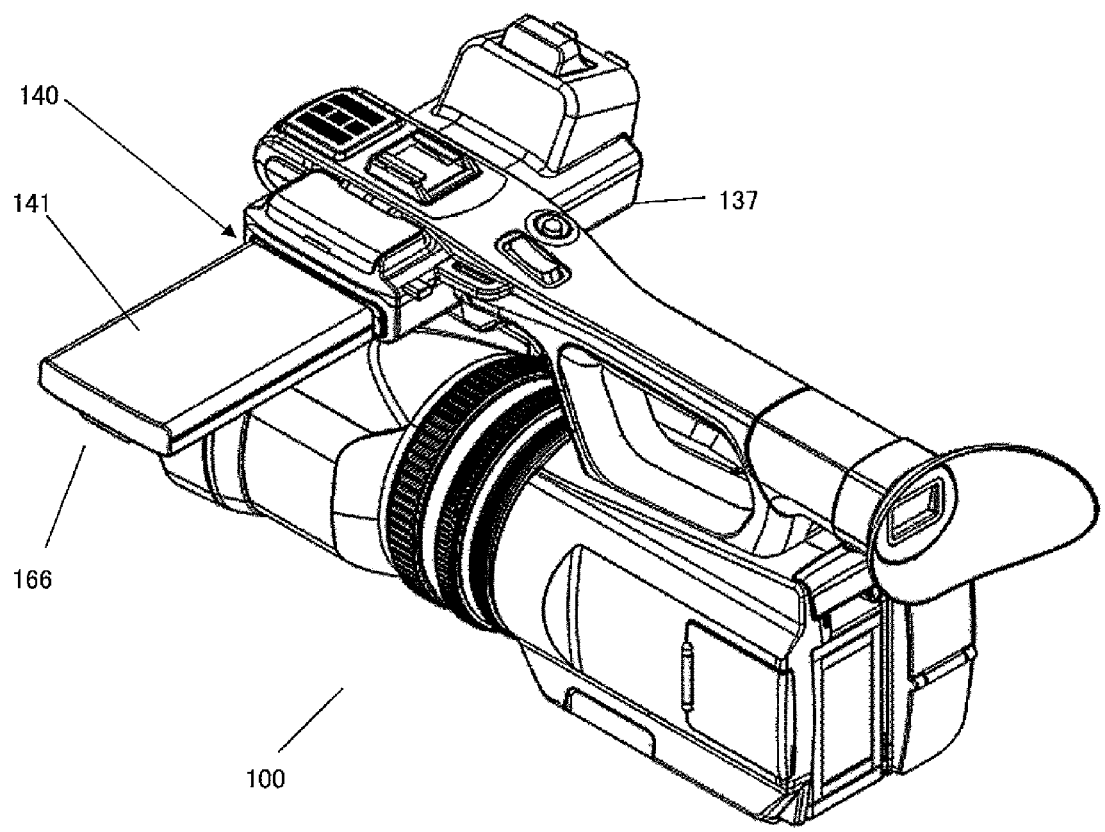
FIG. 3 is an external view of the camcorder 100 when a monitor unit 141 is extended according to an exemplary Embodiment 1.

FIG. 3 is an external view of the camcorder 100 when the monitor unit 141 is extended. The user pulls out the monitor unit 141 from the monitor accommodating section 137 using an extension rib 166 provided at the tip of the monitor unit 141.

As shown in FIG. 3, when using the monitor unit 141, the monitor unit 141 is slid in a direction perpendicular to the longitudinal direction of the handle 135 to be pulled out from the monitor accommodating section 137.

Figure 4:
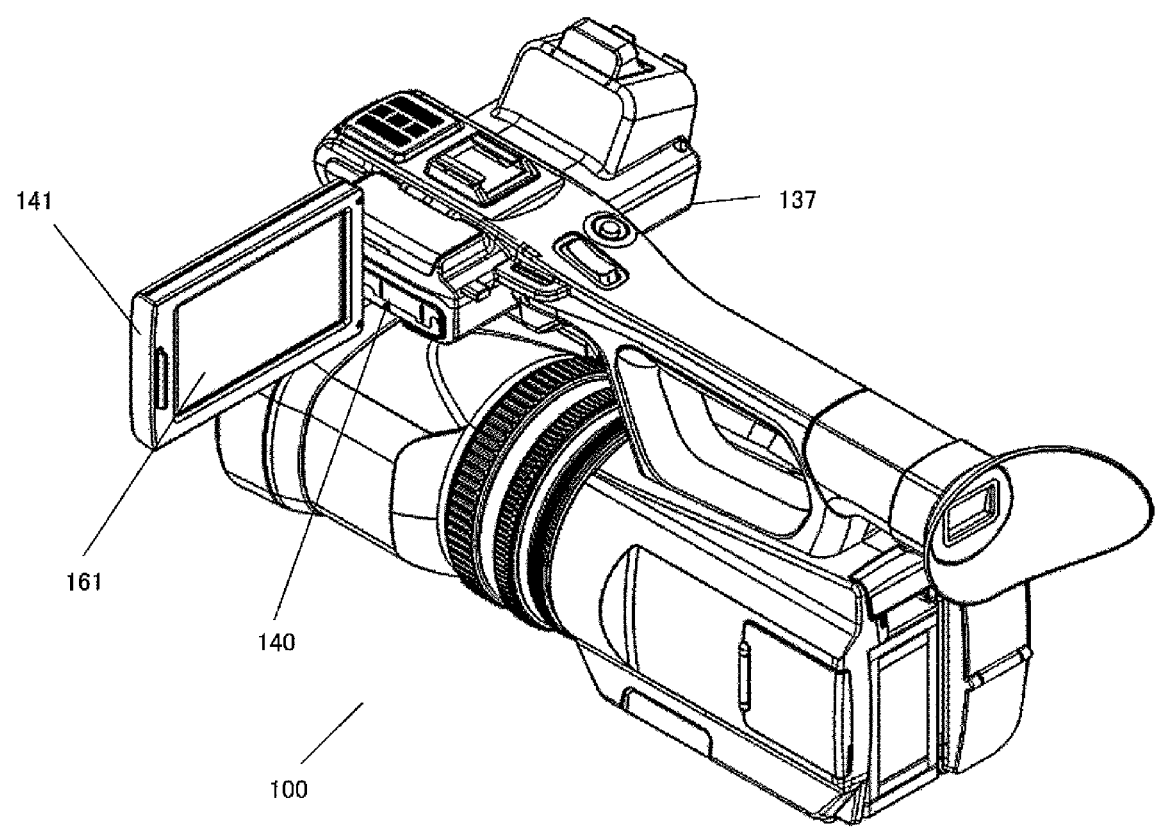
FIG. 4 is an external view of the camcorder 100 when the monitor unit 141 is used in a normal rotational position according to an exemplary Embodiment 1.

FIG. 4 is an external view of the camcorder 100 when the monitor unit 141 is used in a normal rotational position. After pulling out the monitor unit 141 from the monitor accommodating section 137, the user can rotate the monitor unit 141 in a predetermined direction over a certain angle so as to place the monitor unit 141 in such a position (the normal rotational position) that the display panel 161 is facing the user, as shown in FIG. 4. Thus, the user can take a video while checking the image being taken as it is displayed on the display panel 161 of the monitor unit 141.

Figure 5:
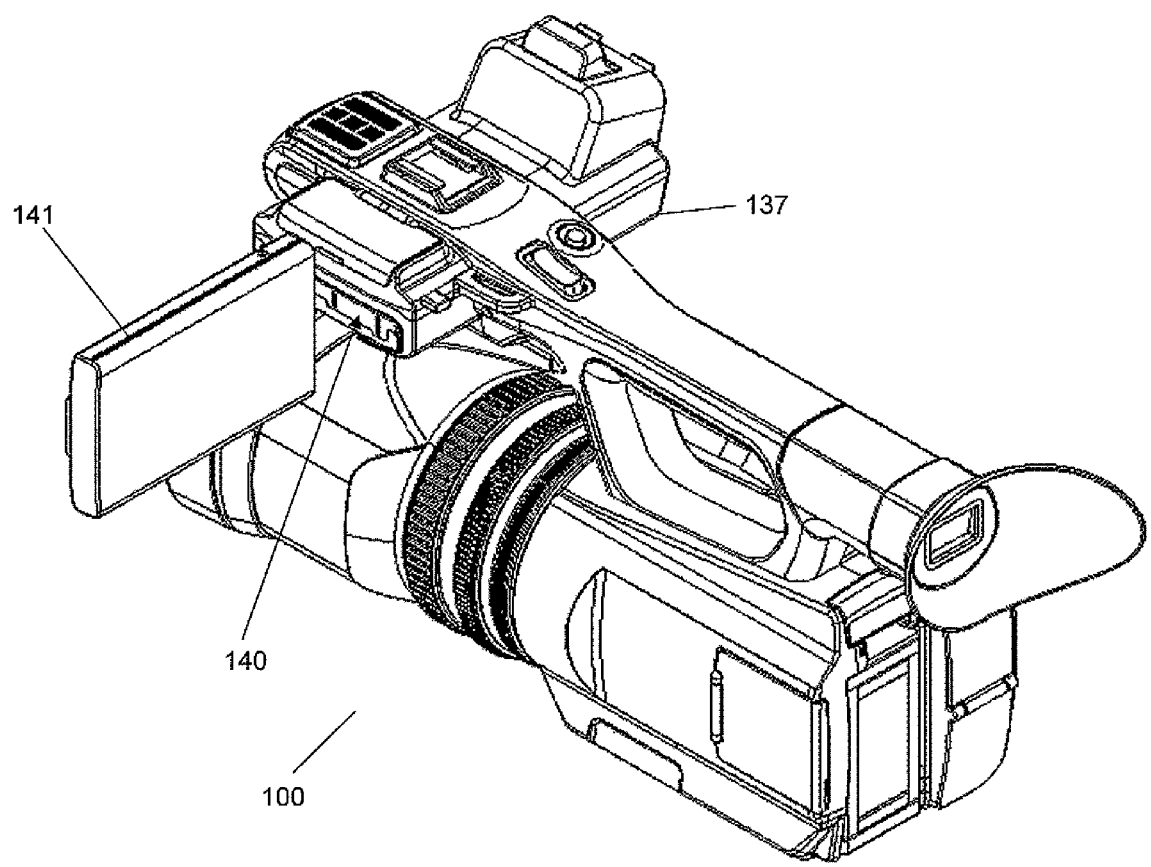
FIG. 5 is an external view of the camcorder 100 when the monitor unit 141 is used in a reverse rotational position according to an exemplary Embodiment 1.

FIG. 5 is an external view of the camcorder 100 when the monitor unit 141 is used in a reverse rotational position. The user can rotate the monitor unit 141 by 180 degrees from the normal rotational position so as to place the monitor unit 141 in a reverse rotational position as shown in FIG. 5. Then, the display panel 161 of the monitor unit 141 is facing the subject. Thus, where the subject is a person, for example, it is possible to take a video while the person can check the image of the person being taken.

Figure 20:
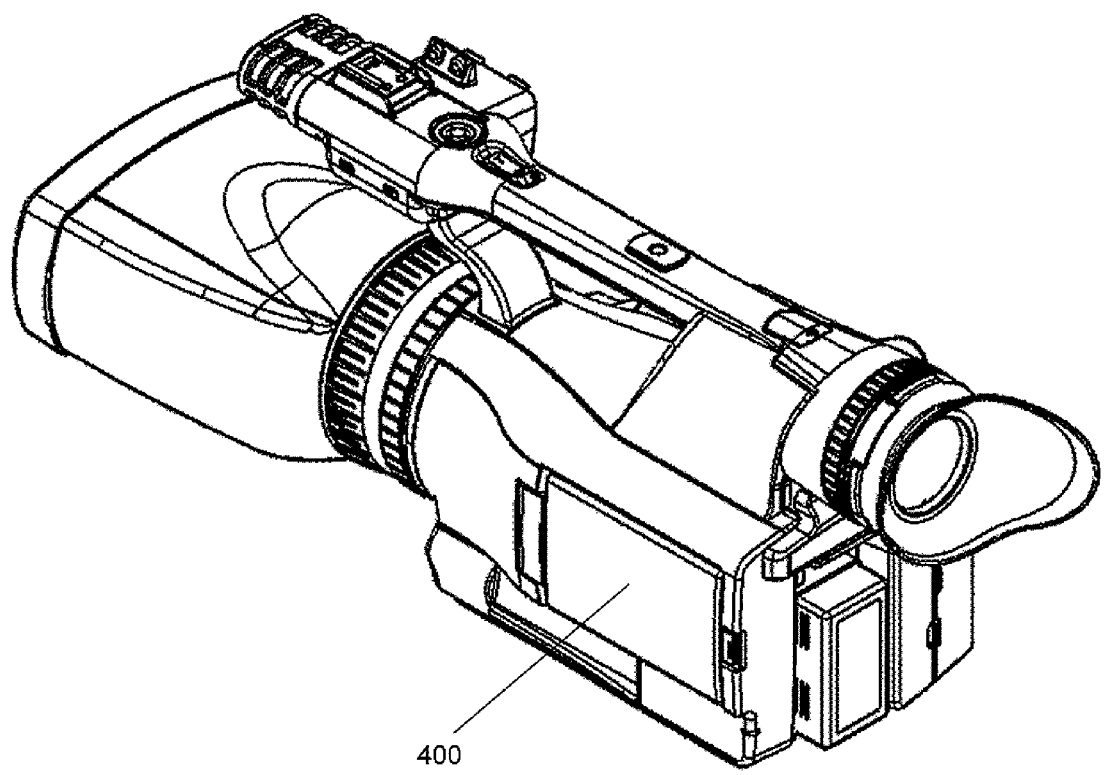
FIG. 20 is an external view of a conventional camcorder.

With the conventional techniques, the operability of the camcorder may not be sufficient. One of the reasons is that the camcorder includes the monitor unit on the side surface of the camera body section as shown in FIG. 20.

The present inventors have found that the following problems may arise when the monitor unit is provided on the side surface of the camera body. That is, when the monitor unit is used (in a state where the monitor unit is open with respect to the camera body), the manual operation ring 111 is hid behind the monitor unit as viewed from the user.

When the user takes a video while supporting the camcorder on the shoulder, it is difficult to view the monitor due to the short distance between the user and the monitor unit.

With the camcorder 100 according to Embodiment 1, the monitor unit 141 is placed on the lower surface of the tip portion of the handle section 130, and therefore the monitor unit 141 can be placed at such a position it is easy to view the monitor unit 141 during use and the operability is improved for the manual operation ring and other members.

Since the monitor unit 141, when not in use, is accommodated in the monitor accommodating section 137, the monitor unit 141 is protected by the monitor accommodating section 137 and does not interfere with the user carrying the camcorder 100.

[1-1-2. Configurations of Slide Monitor Unit and Monitor Accommodating Section]

Figure 6:
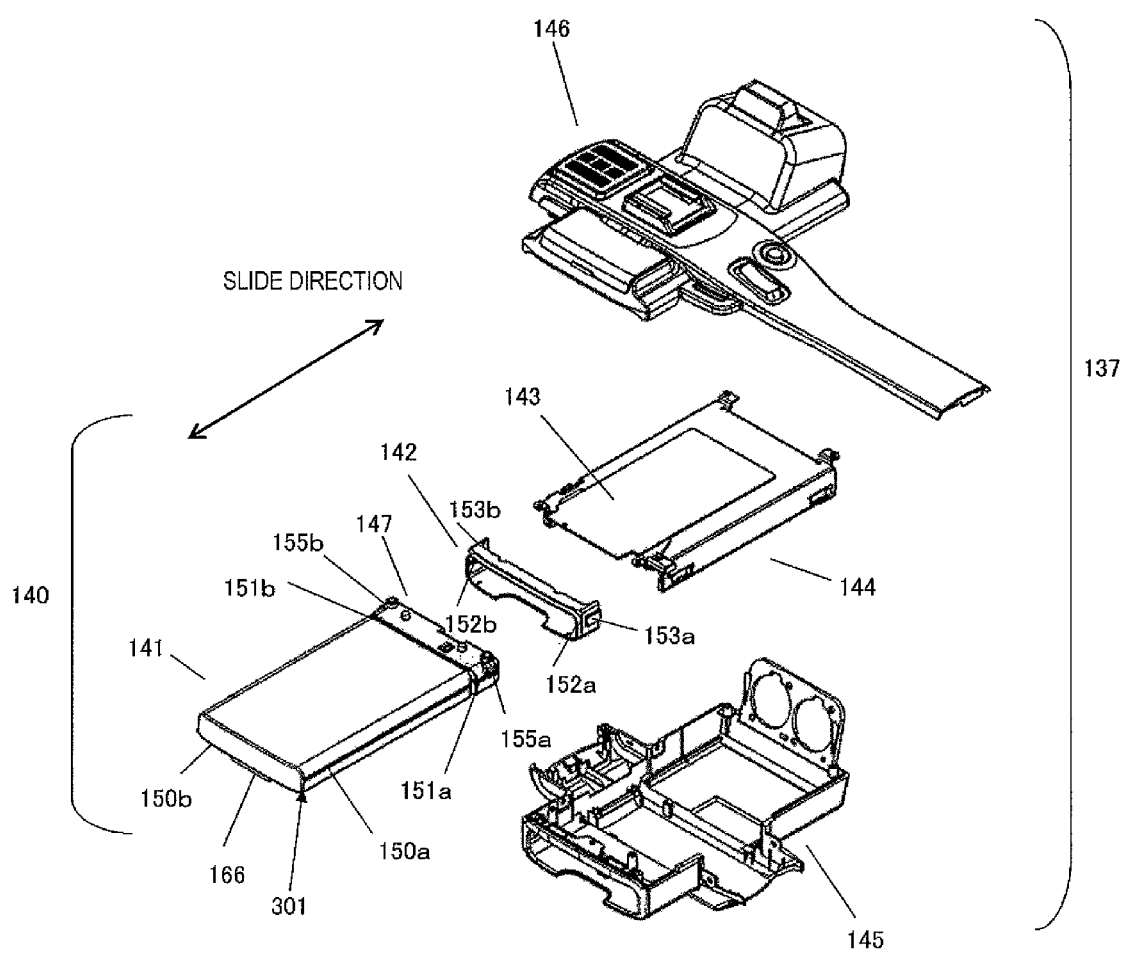
FIG. 6 is an exploded perspective view of a slide monitor unit 140 and a monitor accommodating section 137 according to an exemplary Embodiment 1.

Referring to FIG. 6, the configuration of the slide monitor unit 140 and that of the monitor accommodating section 137 will now be described.

FIG. 6 is an exploded perspective view of the slide monitor unit 140 and the monitor accommodating section 137. The slide monitor unit 140 includes the monitor unit 141, a hinge unit 147, a slide piece 142, and a slide unit 144.

The hinge unit 147 is configured to be coupled to the monitor unit 141 by a screw, or the like. Since the hinge unit 147 includes a rotation mechanism, the monitor unit 141 can rotate with respect to the hinge unit 147.

The monitor unit 141 includes a monitor groove 150 (150*a*, 150*b*) on both side surfaces thereof. The hinge unit 147 includes a hinge groove 151 (151*a*, 151*b*) on both side surfaces thereof. When the monitor unit 141 and the hinge unit 147 are coupled to each other, the monitor groove 150*a* forms a straight-line groove together with the hinge groove 151*a*. Similarly, the monitor groove 150*b* forms a straight-line groove together with the hinge groove 151*b*.

The monitor accommodating section 137 includes an accommodation case 145 and a handle upper unit 146. When the accommodation case 145 and the handle upper unit 146 are coupled to each other, there is provided a box-shaped accommodation space. The monitor accommodating section 137 accommodates the slide monitor unit 140 in this accommodation space.

Members such as the microphone 131, the shoe 133, the connection terminal 132 and the manipulation section 134 can be provided on the upper surface of the handle upper unit 146. These members are electrically connected to the controller 207 of the camera body section 120 via a circuit board placed on the upper surface of the slide unit 144. Thus, the controller 207 can electrically control these members.

[1-1-3. Configuration of Slide Piece]

Figure 7A:
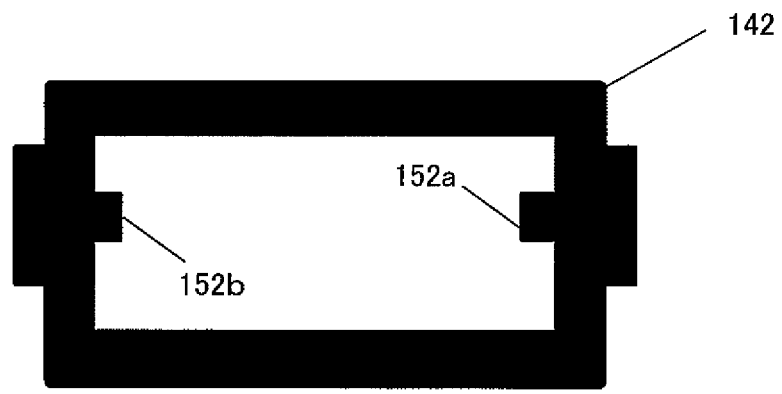
FIGS. 7A to 7C are diagrams illustrating a slide piece 142 according to an exemplary Embodiment 1.
Figure 7B:
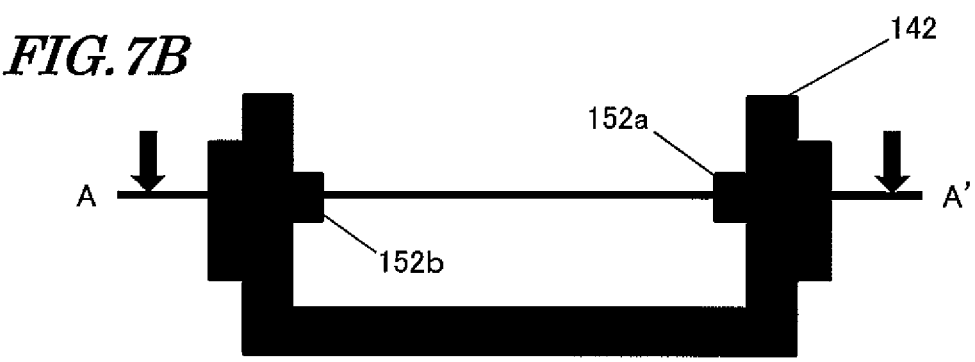
Figure 7C:
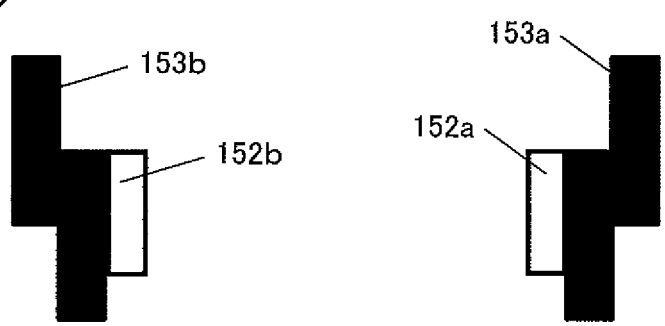

Referring to FIGS. 6 and 7, the configuration of the slide piece 142 will be described. FIG. 7A is a front view showing the rectangular slide piece 142 as viewed from the side toward which the monitor unit 141 is pulled out. FIG. 7B is a front view showing the slide piece 142 having a rectangular shape of which one side is absent as viewed from the side toward which the monitor unit 141 is pulled out. FIG. 7C is a cross-sectional view as viewed on the plane AA' of the slide piece 142 having a rectangular shape of which one side is absent as shown in FIG. 7B.

The slide piece 142 includes a groove 153 (153*a*, 153*b*) having a depressed shape on both inner side surfaces. The slide piece 142 includes a rib 152 (152*a*, 152*b*) at a position that is adjacent to the groove 153 (153*a*, 153*b*) which is located on both inner side surfaces and that is on the side toward which the monitor unit 141 is pulled out.

The rib 152 (152*a*, 152*b*) of the slide piece 142 engages with the straight-line groove formed by the monitor unit 141 and the hinge unit 147 so that the monitor unit 141 and the hinge unit 147 are slidable with respect to the slide piece 142.

In Embodiment 1, the shape of the slide piece 142 is rectangular as shown in FIG. 6 or FIG. 7A. However, the slide piece 142 is not limited to such a shape. For example, the slide piece 142 may have a rectangular shape of which one side is absent as shown in FIGS. 7B and 7C, instead of a rectangular shape as shown in FIG. 7A. Even with such a shape, the slide piece 142 can slidably support the monitor unit 141 and the hinge unit 147. Where the slide piece 142 has a rectangular shape of which one side is absent, the slide piece 142 may be provided in the electronic device upside down from the orientation shown in FIG. 7B.

[1-1-4. Configuration of Monitor Unit]

Figure 8:
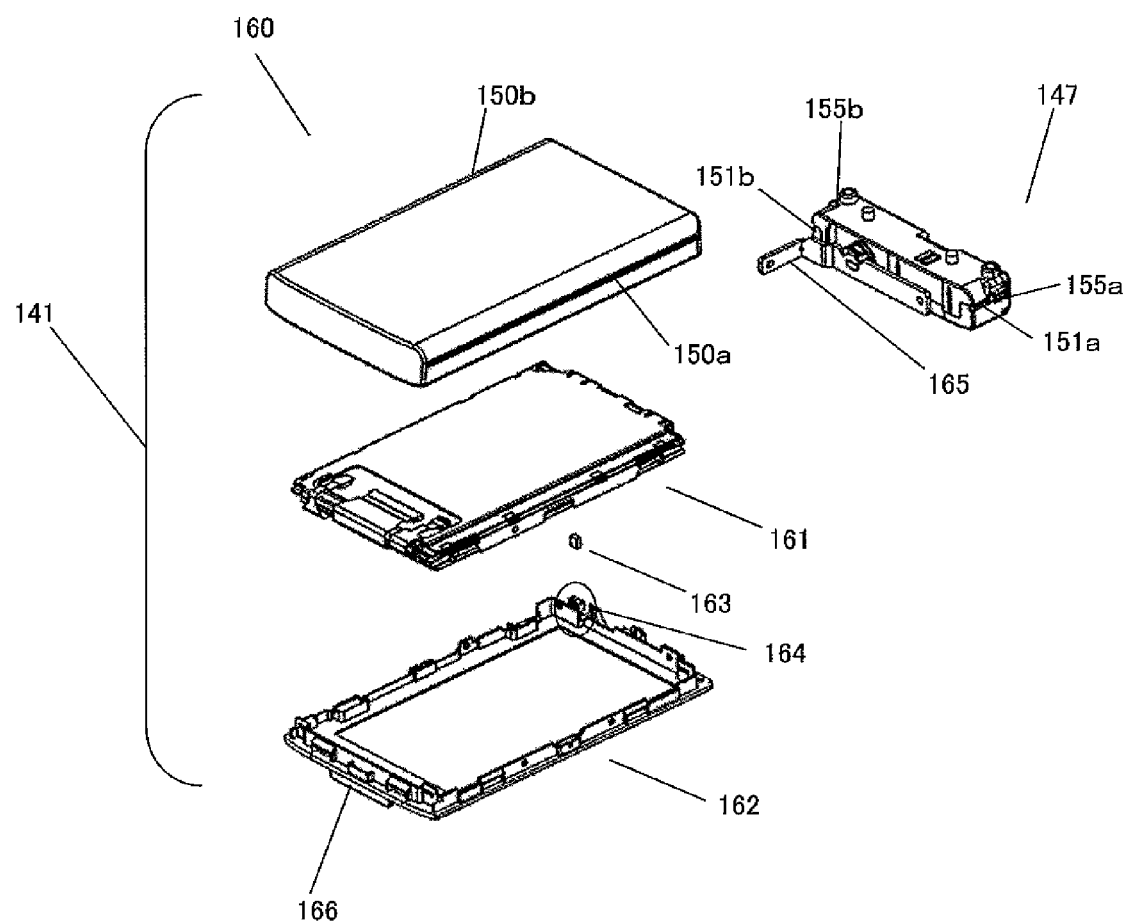
FIG. 8 is an exploded perspective view of the monitor unit 141 according to an exemplary Embodiment 1.

FIG. 8 is an exploded perspective view of the monitor unit 141. The monitor unit 141 includes a monitor upper case 160, the display panel unit 161 which is an image display section, a monitor lower case 162, and a reverse rotation detection magnet 163.

The monitor upper case 160 includes the monitor groove 150 (150*a*, 150*b*) on both outer side surfaces. The monitor lower case 162 includes a magnet pocket 164 for accommodating the reverse rotation detection magnet 163, and the extension rib 166 which is a tab used by the user for pulling out the monitor unit 141 from the monitor accommodating section 137.

The display panel unit 161 is accommodated between the monitor upper case 160 and the monitor lower case 162. The monitor lower case 162 has a frame shape with its surface hollowed out and is shaped so that the display surface of the display panel unit 161 is exposed on the outside.

The monitor unit 141 includes the display panel 161 on one surface thereof. The display panel 161 of the monitor unit 141 is electrically connected to the controller 207 in the camera body section 120, and the image display on the display panel 161 is controlled by the controller 207.

[1-1-5. Configuration of Hinge Unit]

Figure 9:
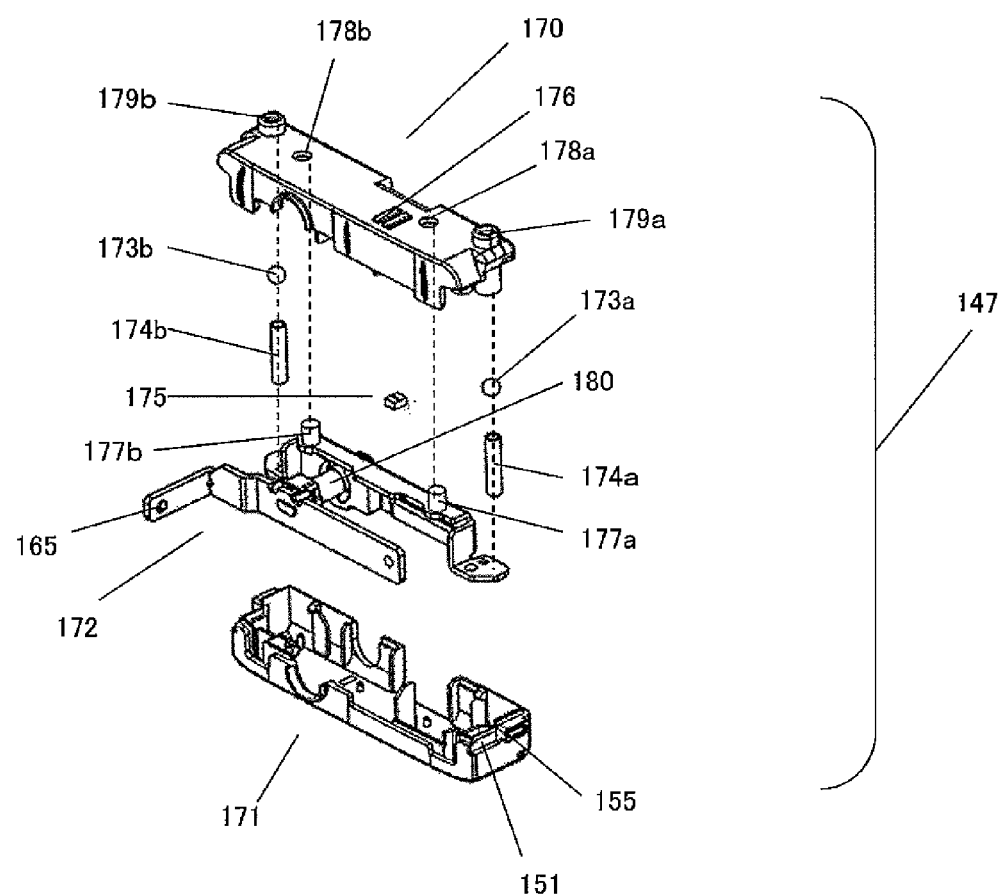
FIG. 9 is an exploded perspective view of a hinge unit 147 according to an exemplary Embodiment 1.

FIG. 9 is an exploded perspective view of the hinge unit 147. The hinge unit 147 includes a hinge upper case 170, a steel ball 173 (173*a*, 173*b*), a lock spring 174 (174*a*, 174*b*), a rotational hinge unit 172, a slide detection magnet 175, and a hinge lower case 171.

The hinge upper case 170 includes a magnet pocket 176, an hole 178 (178*a*, 178*b*), and a steel ball hole 179 (179*a*, 179*b*). The hinge upper case 170 is coupled to the hinge lower case 171 with the rotational hinge unit 172 accommodated therein.

The rotational hinge unit 172 includes a rotation plate 165, a lock pin 177 (177*a*, 177*b*), and a rotation shaft 180.

The hinge lower case 171 includes, on both outer side surfaces, a rectangular rib 155 (155*a*, 155*b*), and the hinge groove 151 (151*a*, 151*b*) provided together with the rectangular rib 155.

[1-1-6. Configuration of Slide Unit]

Figure 10:
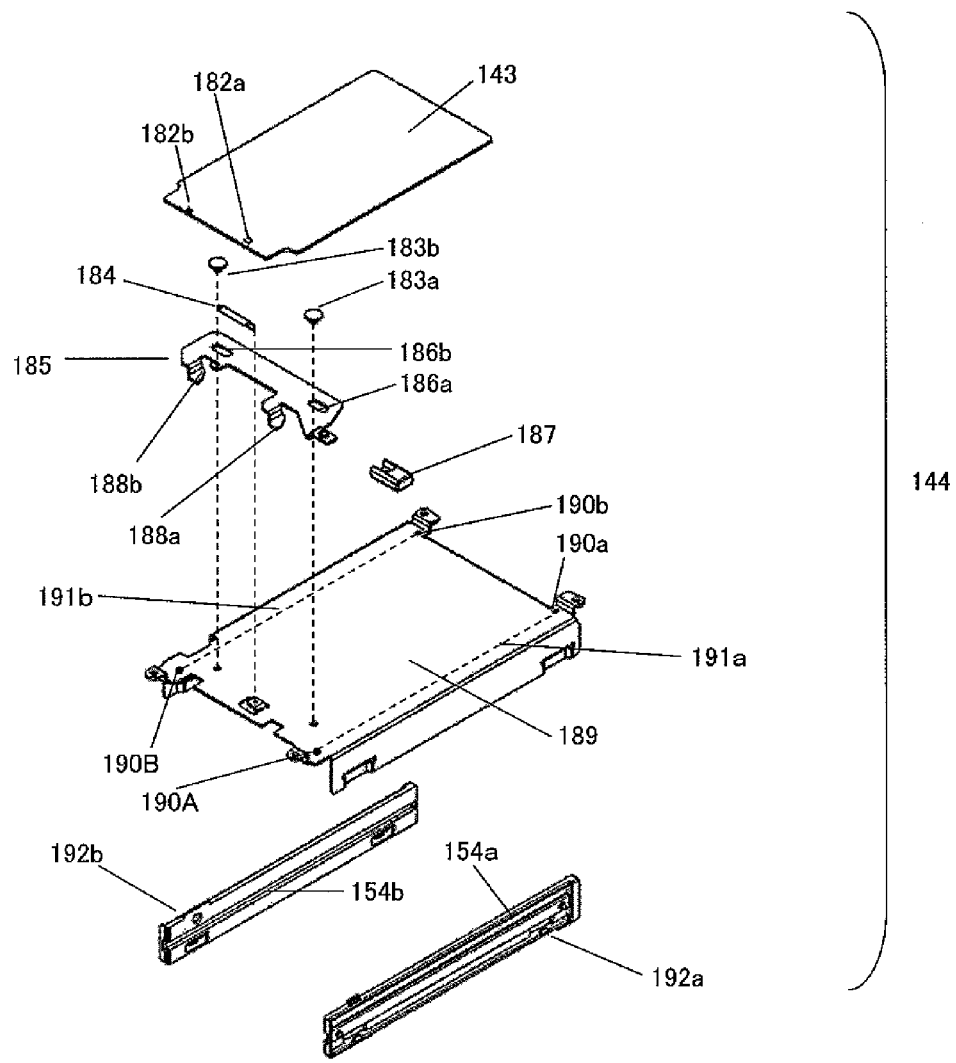
FIG. 10 is an exploded perspective view of a slide unit 144 according to an exemplary Embodiment 1.

FIG. 10 is an exploded perspective view of the slide unit 144. The slide unit 144 includes a circuit board 143, a lock pin 183 (183*a*, 183*b*), a lock spring 184, a lock angle 185, a lock button 187, a slide frame 189, and a rail 192 (192*a*, 192*b*).

The circuit board 143 is a substrate for electrically connecting the manipulation section 134 provided in the handle section 130 and the controller 207 in the camera body section 120 to each other. The circuit board 143 is attached to the upper surface of the slide frame 189 by a screw, for example.

The rail 192 (192*a*, 192*b*) is fit to the both inner side surfaces of the slide frame 189.

The circuit board 143 is provided with the slide detection sensor 182*a*, and the reverse rotation detection sensor 182*b*. The slide detection sensor 182*a* and the reverse rotation detection sensor 182*b* are electrically connected to the controller 207 in the camera body section 120. Therefore, the controller 207 in the camera body section can receive the detection results of the slide detection sensor 182*a* and the reverse rotation detection sensor 182*b*.

The lock angle 185 includes a lock rest 188 (188*a*, 188*b*), and a slide hole 186 (186*a*, 186*b*). The lock angle 185 is coupled to the slide frame 189.

The lock spring 184 is attached so as to connect together the engaging portion of the lock angle 185 and that of the slide frame 189. The lock angle 185 is configured so that when it is attached to the slide frame 189, the lock pin 183 (183*a*, 183*b*) is fit in a corresponding hole of the slide frame 189 via the slide hole 186 (186*a*, 186*b*).

The opening of the slide hole 186 has an oval shape, and the length thereof in the longitudinal direction is greater than the diameter of the lock pin 183. Thus, when the lock angle 185 slides, the relative position of the lock pin 183 with respect to the slide hole 186 moves.

The slide frame 189 includes an hole 190 (190*a*, 190*b*, 190A, 190B) provided at two (front and rear) positions on each side (a total of four positions) on the upper surface. For the description of a click mechanism to follow, the path connecting together the hole 190*a* and the hole 190A will be referred to as a ball path 191*a*. Similarly, the path connecting together the hole 190*b* and the hole 190B will be referred to as a ball path 191*b*.

[1-2. Operation]

[1-2-1. Operation of Monitor Unit]

Referring to FIGS. 6 and 11, the slide mechanism of the monitor unit 141 will be described.

FIG. 11 is a diagram illustrating the slide mechanism of the monitor unit 141. FIG. 11A is a cross-sectional view showing a state where the slide piece 142 and the rail 192 (192*a*, 192*b*) are fit in the accommodation case 145.

FIG. 11B is a diagram illustrating an engagement relationship between the rib (152, 155) and the groove (150, 151, 153, 154) when the monitor unit 141 is in the retracted position. FIG. 11C is a diagram illustrating the engagement relationship between the rib (152, 155) and the groove (150, 151, 153, 154) when the monitor unit 141 is in the intermediate position between the retracted position and the extended position. FIG. 11D is a diagram illustrating the engagement relationship between the rib (152, 155) and the groove (150, 151, 153, 154) when the monitor unit 141 is in the extended position.

As shown in FIG. 11A, in the fit position, the slide piece 142 and the rail 192 are in close contact with each other. That is, the slide piece 142 is adjacent to the slide unit 144 having the rail 192 in the slide direction of the monitor unit 141.

Therefore, the groove 153 (153*a*, 153*b*) of the slide piece 142 and the groove 154 (154*a*, 154*b*) of the rail 192 (192*a*, 192*b*) together form a continuous straight-line groove. As shown in FIGS. 11B to 11D, the monitor groove 150 (150*a*, 150*b*) of the monitor unit 141 and the hinge groove 151 (151*a*, 151*b*) of the hinge unit 147 together form a continuous straight-line groove.

The rib 152 (152*a*, 152*b*) of the slide piece 142 engages with the straight-line groove formed by the monitor unit 141 and the hinge unit 147 so that the monitor unit 141 and the hinge unit 147 can slide, and the rectangular rib 155 (155*a*, 155*b*) of the hinge unit 147 slidably engages with the straight-line groove formed by the slide piece 142 and the rail 192.

An integral unit of the monitor unit 141 and the hinge unit 147 (hereinafter, referred to also as a display section 301) slides between the retracted position and the extended position by being supported by the rib 152 (152*a*, 152*b*) of the slide piece 142 and the rectangular rib 155 (155*a*, 155*b*) of the hinge unit 147.

Herein, the retracted position is a position of the monitor unit 141 at which the monitor unit 141 is accommodated in the space of the slide unit 144. The extended position is a position of the monitor unit 141 to which the monitor unit 141 is pulled out from the slide unit 144.

As shown in FIGS. 11B to 11D, as the user pulls out the monitor unit 141 using the extension rib 166, the monitor unit 141 transitions from a state where it is accommodated in the monitor accommodating section 137 to a non-retracted state (extended state). That is, the monitor unit 141 slides from the retracted position to the extended position.

Therefore, even if the display panel 161 is provided on the lower surface of the monitor unit 141, the display panel 161 will not be rubbed and scratched against the inner surface of the monitor accommodating section 137 when the display section 301 slides. Moreover, it is possible to reduce the rattling up and down of the display section 301 when the display section 301 slides.

As shown in FIG. 11B, when the monitor unit 141 is in the retracted state (retracted position), the rectangular rib 155 (155a, 155b) is located at one end along the groove 154 (154a, 154b) that is opposite to the slide piece 142.

Then, the integral unit of the monitor unit 141 and the hinge unit 147 is fully accommodated in the monitor accommodating section 137. The joint surface between the monitor unit 141 and the hinge unit 147 is not exposed to the outside. Therefore, even if the user applies a force so as to rotate the monitor unit 141 with respect to the hinge unit 147, the monitor unit 141 will not rotate because the monitor groove 150 and the rib 152 are engaging with each other. That is, the rotation of the monitor unit 141 with respect to the hinge unit 147 is restricted.

As shown in FIG. 11D, when the monitor unit 141 is pulled out into the extended position, the rectangular rib 155 moves from the groove 154 of the rail 192 to the groove 153 of the slide piece 142.

Then, in the extended position, the slide piece 142 covers the hinge unit 147. Then, the joint surface between the monitor unit 141 and the hinge unit 147 is exposed to the outside, and the monitor groove 150 and the rib 152 are disengaged from each other. Therefore, if the user applies a force so as to rotate the monitor unit 141 with respect to the hinge unit 147, the monitor unit 141 rotates with respect to the hinge unit 147.

According to Embodiment 1, a portion to engage with the slide piece 142 may be of a different material from that of the slide piece 142. That is, in Embodiment 1, the hinge lower case 171 of the hinge unit 147 and the monitor upper case 160 of the monitor unit 141, which are to engage with the slide piece 142, may be of a different material from that of the slide piece 142. For example, the main material of the slide piece 142 is polyacetal, and the main material of the hinge lower case 171 of the hinge unit 147 and the monitor upper case 160 of the monitor unit 141 is ABS (Acrylonitrile Butadiene Styrene).

Polyacetal, which is the main material of the slide piece 142, is a material having excellent wear resistance and slidability. Therefore, according to Embodiment 1, it is possible to reduce the sliding noise to be heard while the monitor unit 141 slides.

[1-2-2. Click Operation of Monitor Unit]

Figure 12A:
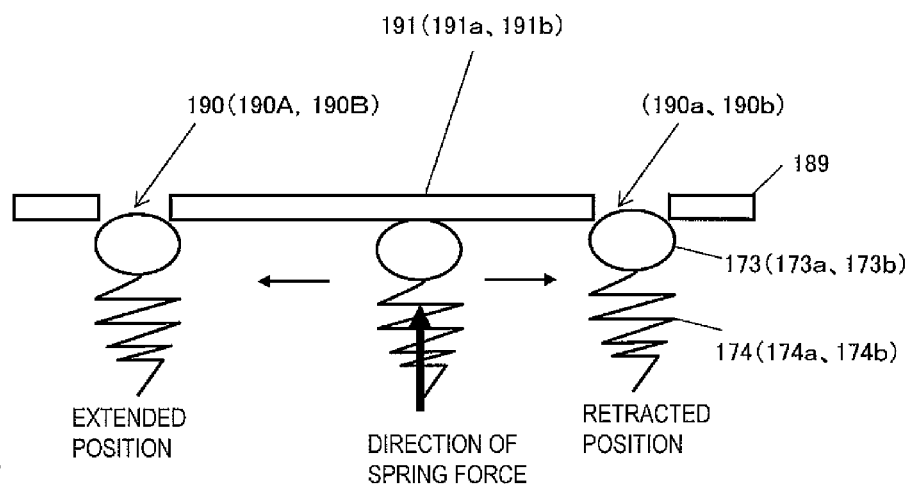
FIGS. 12A to 12C are diagrams illustrating a click mechanism when the monitor unit 141 is extended and when the monitor unit 141 is retracted according to an exemplary Embodiment 1.
Figure 12B:
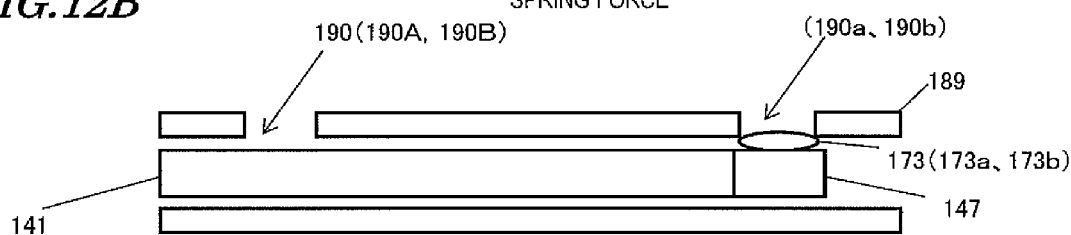
Figure 12C:
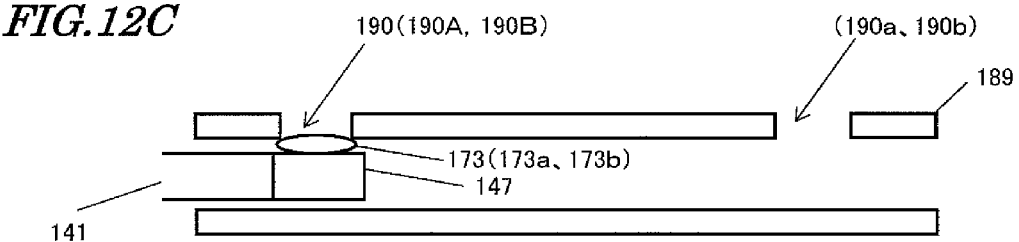

Referring to FIG. 12, the click mechanism will be described. FIG. 12A is a diagram illustrating the click mechanism when the monitor unit 141 is extended (into the extended position) and when the monitor unit 141 is retracted (into the retracted position). FIG. 12B is a diagram showing the positional relationship of the monitor unit 141 and the hinge unit 147 with respect to the slide unit 144 when the monitor unit 141 is in the retracted position. FIG. 12C is a diagram showing the positional relationship of the monitor unit 141 and the hinge unit 147 with respect to the slide unit 144 when the monitor unit 141 is in the extended position.

When the monitor unit 141 slides along the slide unit 144, the steel ball 173 (173a, 173b) moves along a ball path 191 (191a, 192b) while being urged by the lock spring 174 (174a, 174b) toward the slide frame 189. Thus, it is possible to generate a moderate degree of friction during the slide movement. Therefore, it is possible to reduce the rattling up and down of the monitor unit 141 when the monitor unit 141 slides.

When the monitor unit 141 reaches the retracted position, the steel ball 173 (173a, 173b) engages with, and is locked in, the hole 190 (190a, 190b) (FIG. 12B). Similarly, when the monitor unit 141 reaches the extended position, the steel ball 173 (173a, 173b) engages with, and is locked in, the hole 190 (190a, 190b) (FIG. 12C). When this locking occurs, a vibration is transmitted to the user who is sliding the monitor unit 141. Thus, the user can know that the monitor unit 141 has been retracted or extended.

[1-2-3. Detection of Extension of Monitor Unit]

Figure 13B:
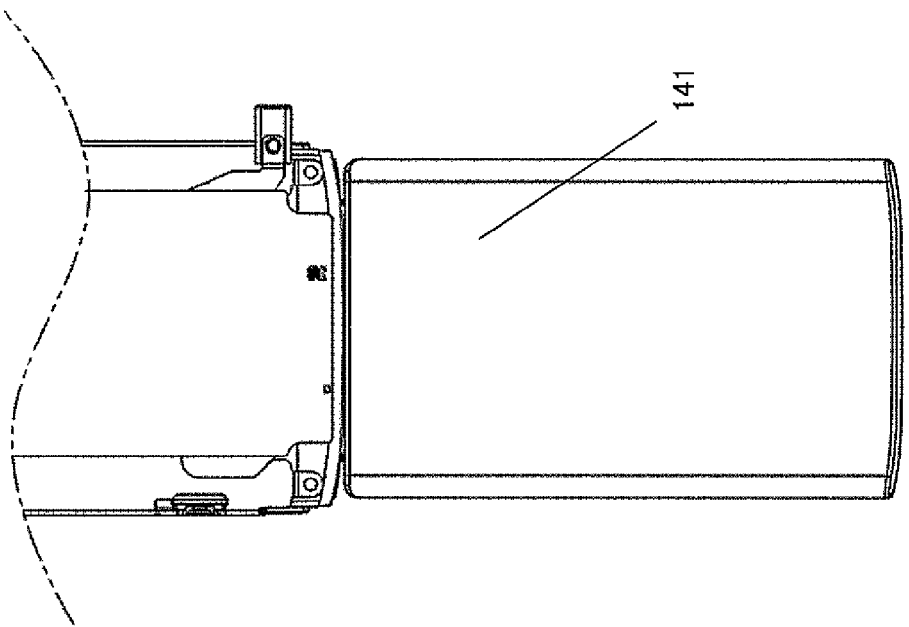
FIGS. 13A and 13B are diagrams illustrating how the extension of the monitor unit 141 is detected according to an exemplary Embodiment 1.
Figure 13A:
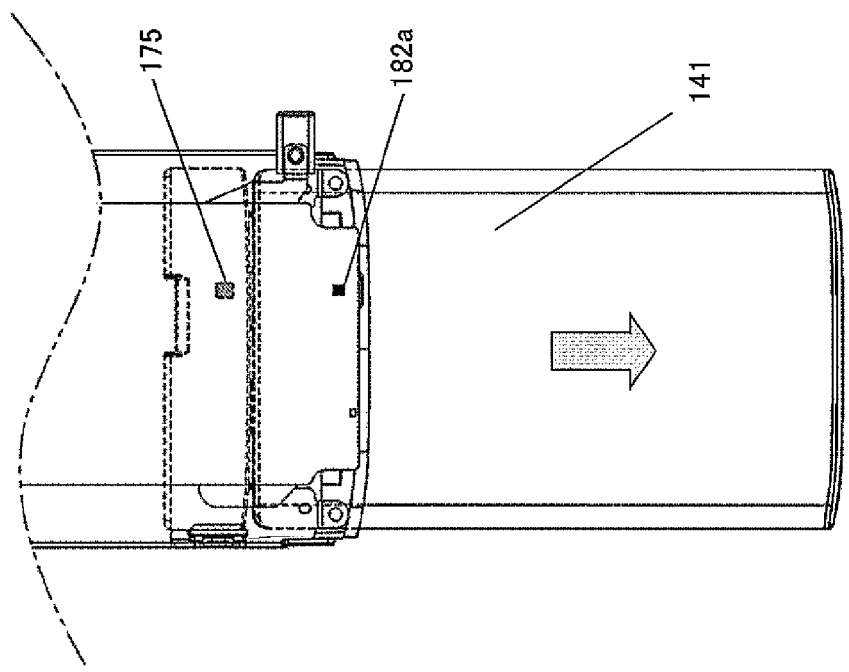

FIG. 13 is a diagram illustrating how the extension of the monitor unit 141 is detected. As shown in FIGS. 13A and 13B, when the monitor unit 141 is in the extended position (FIG. 13B), the slide detection magnet 175 provided in the hinge unit 147 and the slide detection sensor 182a provided on the circuit board 143 on the upper surface of the slide unit 144 are met with each other. Thus, the slide detection sensor 182a detects that the monitor unit 141 has moved to the extended position.

The detection result is notified to the controller 207 in the camera body. Therefore, the controller 207 recognizes that the monitor unit 141 has moved to the extended position, and performs a control so as to start an image display on the display panel 161 of the monitor unit 141.

As described above, the controller 207 starts an image display on the display panel 161 after the monitor unit 141 has been extended. Therefore, when retracted, where an image display on the display panel 161 is not needed, no image is displayed on the display panel 161, whereby it is possible to reduce the power consumption.

[1-2-4. Restriction of Slide of Monitor Unit]

In the above description, the click mechanism whereby the user can know that the monitor unit 141 has been retracted or extended has been described referring to FIG. 12. Now, a lock mechanism whereby the slide of the monitor unit 141 is restricted will be described.

FIG. 14 is a diagram illustrating the lock mechanism of the monitor unit 141. FIG. 14A is a diagram showing a state where when the monitor unit 141 has been fully extended from the monitor accommodating section 137 (in the extended position), the lock mechanism is activated to restrict the movement in the retracting direction. FIG. 14B is a diagram showing a state where the restriction of movement in the retracting direction by the lock mechanism is released by pressing the lock button 187 (lock release button). FIG. 14C to 14E are diagrams showing the transition from a state where the monitor unit 141 is accommodated in the monitor accommodating section 137 (the retracted position) to a state where the monitor unit 141 is extended, thereby activating the lock mechanism.

The lock angle 185 includes the lock rest 188 (188a, 188b) and the slide hole 186 (186a, 186b). The lock angle 185 is coupled to the slide frame 189. The lock spring 184 is attached to the slide frame 189 so as to connect together the engaging portion of the lock angle 185 and that of the slide frame 189.

The lock spring 184 is biased in the direction of pressing the lock button 187. That is, as shown in FIG. 14B, when the user presses the lock button 187, a force is applied upon the lock spring 184 in the opposite direction to the direction in which the lock spring 184 is urged.

Where the slide movement of the monitor unit 141 is restricted, the lock pin 177 (177a, 177b) is in contact with the lock rest 188 (188a, 188b) as shown in FIG. 14E. The restriction of the slide of the monitor unit 141 can be released by pressing the lock button 187.

As shown in FIG. 14C, as the monitor unit 141 is pulled out from the state where it is accommodated in the monitor accommodating section 137 (the retracted position), the lock pin 177 (177a, 177b) comes into contact with the lock rest 188 (188a, 188b) (FIG. 14C→FIG. 14D).

The lock rest 188 (188a, 188b) has a sloped shape, and the lock pin 177 (177a, 177b), while sliding against the sloped shape, pushes the lock angle 185 in the opposite direction to the direction in which the lock spring 184 is biased. Thus, the lock pin 177 (177a, 177b) moves to the monitor unit 141 side of the lock rest 188 (188a, 188b). As the lock pin 177 (177a, 177b) moves to the monitor unit 141 side, the lock angle 185 moves to the position shown in FIG. 14E due to the bias of the lock spring 184.

Thus, the lock mechanism acts to restrict the slide of the monitor unit 141 when the monitor unit 141 is pulled out to the extended position from the state where the monitor unit 141 is accommodated in the monitor accommodating section 137 (the retracted position).

Where the lock mechanism is engaging, the restriction of the slide of the monitor unit 141 can be released by pressing the lock button 187.

[1-2-5. Rotation of Monitor Unit]

Figure 15B:
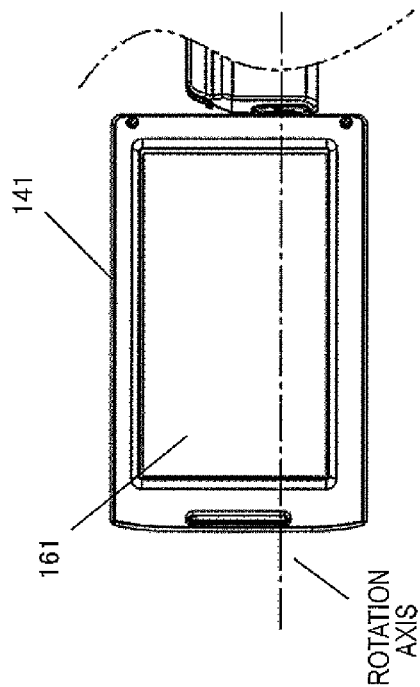
FIGS. 15A to 15C are diagrams illustrating a rotation mechanism of the monitor unit 141 according to an exemplary Embodiment 1.
Figure 15C:
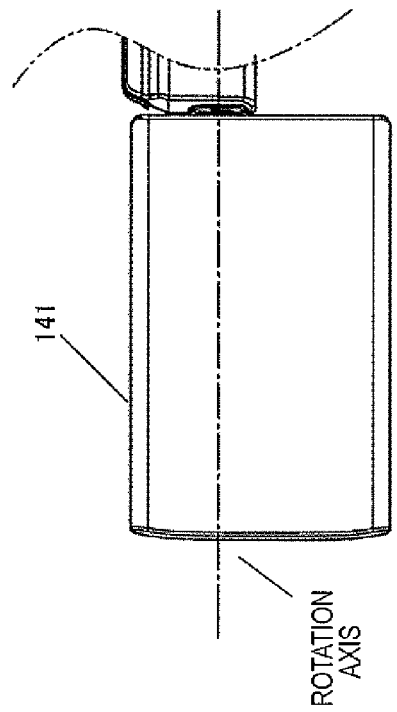
Figure 15A:
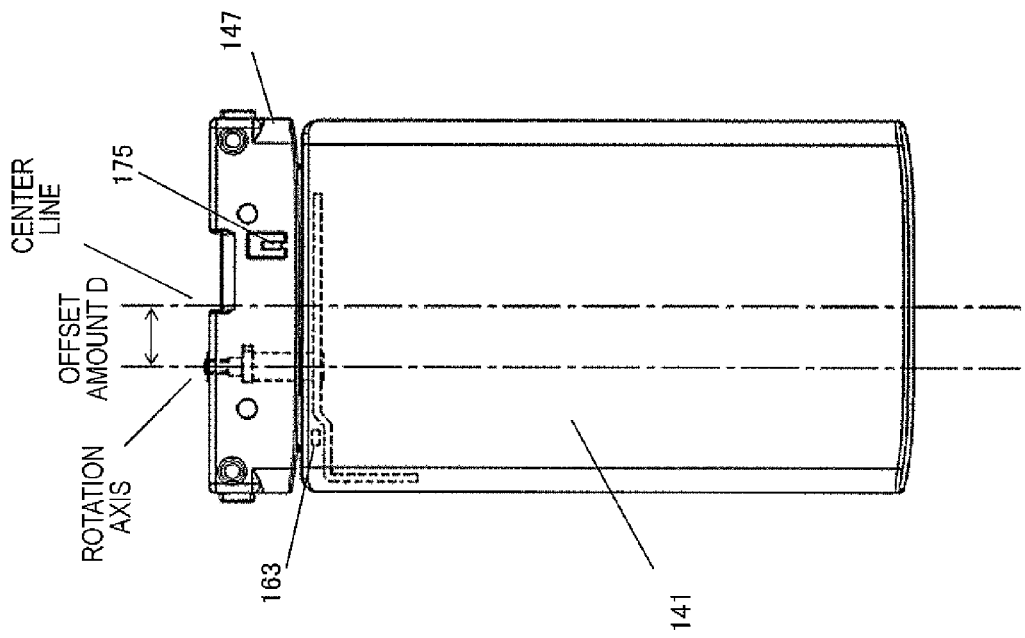

FIG. 15 is a diagram illustrating the rotation mechanism of the monitor unit 141. FIG. 15B is a diagram showing the rotation axis of the monitor unit 141 when the camcorder 100 is used in the normal rotational position shown in FIG. 4. FIG. 15C is a diagram showing the rotation axis of the monitor unit 141 when the camcorder 100 is used in the reverse rotational position shown in FIG. 5.

The rotation axis of the monitor unit 141 is offset from the center line of the monitor unit 141 (the display panel 161) which is parallel to the slide direction, i.e., deviated from the center line by 10 mm, for example.

In Embodiment 1, such a mechanism is referred to as an eccentric mechanism. Thus, the in-use position of the monitor unit 141 to be assumed when the monitor unit 141 is rotated about the rotation axis deviated from the center line can be shifted up or down from the in-use position of the monitor unit 141 which would be assumed when the monitor unit 141 is rotated about the center line.

Herein, the amount of offset representing a predetermined distance between the center line and the rotation axis shown in FIG. 15 defines the amount of shift up or down of the in-use position of the monitor unit 141. According to Embodiment 1, the amount D of offset is 10 mm, for example.

Thus, the monitor unit 141 can be placed at a higher position when the monitor unit 141 is used, and therefore the user can more easily check the display panel 161 while taking a video. Moreover, when the user takes a video while the lens position and the user's line of sight are substantially at the same height, the user can take a video while checking the subject of which the view is not blocked by the monitor unit 141.

When the monitor unit 141 is placed close to the manual operation ring 111, there is only a small space for the user to operate the manual operation ring 111 while the monitor unit 141 is in use. The camcorder 100 of Embodiment 1 has an eccentric mechanism which can shift the monitor unit 141 to a higher position. Therefore, even if the position of the monitor unit 141 and the position of the manual operation ring 111 are close to each other, it is possible to ensure a sufficient space for the user to operate the manual operation ring 111.

Figure 16:
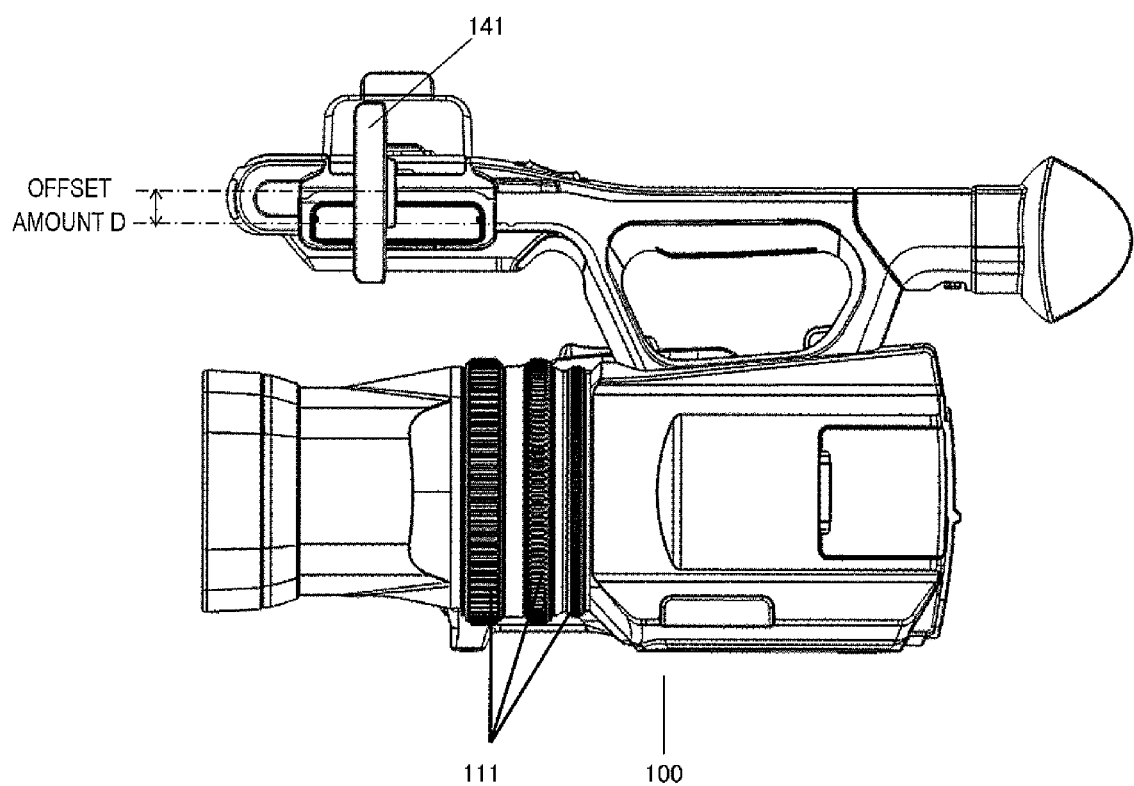
FIG. 16 is a side view of the camcorder 100 when the monitor unit 141 is used in a normal rotational position according to an exemplary Embodiment 1.

FIG. 16 is a side view of the camcorder 100 when the monitor unit 141 is used in the normal rotational position. In the camcorder 100 of Embodiment 1, it is possible to ensure sufficient spaces in the optical axis direction as well as in the direction perpendicular to the optical axis direction. As shown in FIG. 16, in Embodiment 1, the monitor unit 141 is placed closer to the subject with respect to the position of the manipulation section 111 in the optical axis direction of light incident upon the optical system 201. Therefore, the position of the monitor unit 141 is relatively shifted with respect to the control ring 111.

Therefore, if the camcorder 100 has the eccentric mechanism described above, it is possible to ensure more space for the user to operate the manual operation ring 111. This makes it even easier for the user to operate the manual operation ring 111.

[1-2-6. Detection of Rotation of Monitor Unit]

Figure 18B:
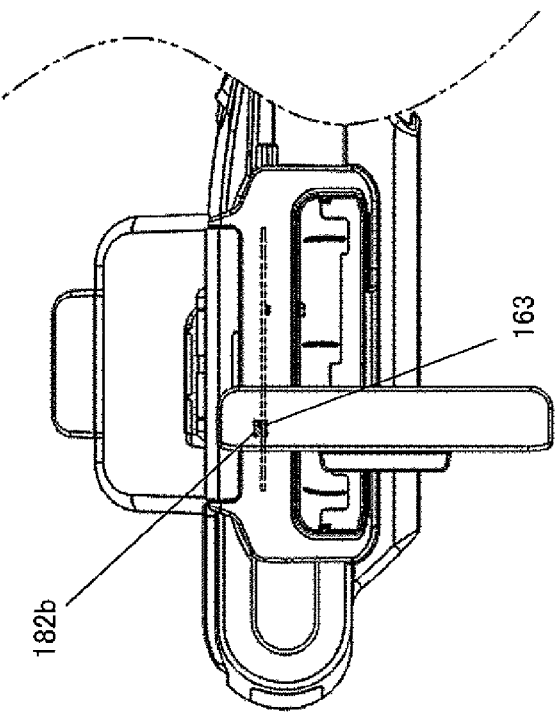
FIGS. 18A and 18B are diagrams illustrating how the reversal of the monitor unit 141 is detected according to an exemplary Embodiment 1.
Figure 18A:
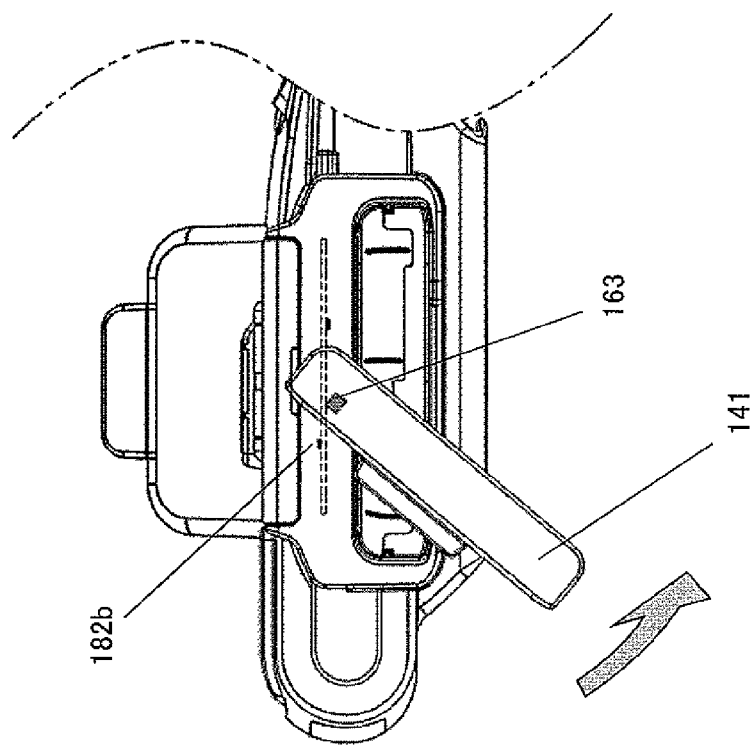

FIG. 18 is a diagram illustrating how the reversal of the monitor unit 141 is detected. As shown in FIG. 18, when the monitor unit 141 has been rotated, the reverse rotation detection magnet 163 provided in the monitor unit 141 and the reverse rotation detection sensor 182b provided on the circuit board 143 on the slide unit 144 are met with each other.

In the camcorder 100 of Embodiment 1, the reverse rotation detection magnet 163 and the reverse rotation detection sensor 182b are met so as to oppose each other when the display panel 161 is facing the subject, i.e., in the reverse rotational position of the monitor unit 141. Then, the reverse rotation detection sensor 182b detects the reverse flipped state of the monitor unit 141. That is, the reverse rotation detection sensor 182b detects that the monitor unit 141 is in the reverse rotational position. The detection result of the reverse rotation detection sensor 182b indicating the reverse rotation state of the monitor unit 141 is notified to the controller 207 in the camera body. The controller 207, recognizing the reverse rotation state of the monitor unit 141, controls the up-down orientation of the image on the display panel 161 of the monitor unit 141. Then, a person standing on the side of the subject can view the image displayed on the display panel 161 of the monitor unit 141 in a correct up-down orientation.

[1-3. Advantageous Effects, Etc.]

As described above, the present embodiment provides advantageous effects as follows.

(1) The camcorder 100 includes: the display section 301 including the monitor unit 141 having the display panel 161; the slide unit 144 having a space in which the display section 301 can be accommodated, the slide unit 144 slidably supporting the display section 301; and the slide piece 142 adjacent to the slide unit 144 in the slide direction of the display section 301, the slide piece 142 slidably supporting the display section, wherein the display section 301 slides between the retracted position at which the display section 301 is accommodated in the space of the slide unit 144 and the extended position to which the display section 301 is pulled out from the slide unit 144.

Then, when the display section 301 slides, the display section 301 is supported by the rib 152 (152a, 152b) of the slide piece 142 and the rectangular rib 155 (155a, 155b) of the hinge unit 147. Therefore, even if the display panel 161 is provided on the lower surface of the monitor unit 141, the display panel 161 will not be rubbed and scratched against the inner surface of the monitor accommodating section 137 when the display section 301 slides. Moreover, it is possible to reduce the rattling up and down of the display section 301 when the display section 301 slides.

(2) The display section 301 further includes the hinge unit 147 provided at one end of the monitor unit 141; the slide unit 144 slidably supports the hinge unit 147 in the display section 301; and the slide piece 142 slidably supports at least one of the monitor unit 141 and the hinge unit 147.

Then, the user can place the monitor unit 141 in the normal rotational position, and take a video while checking the image being taken displayed on the display panel 161 of the monitor unit 141. Moreover, the user can place the monitor unit 141 in the reverse rotational position, and take a video of the user himself/herself while checking the image of the user himself/herself being taken.

(3) The monitor unit 141 is rotatably supported by the hinge unit 147 so that the monitor unit 141 can rotate with respect to the hinge unit 147 about the rotation axis that is offset from the center line of the display panel 161 which is parallel to the slide direction.

Thus, the monitor unit 141 can be placed at a higher position when the monitor unit 141 is used, and therefore the user can more easily check the display panel 161 while taking a video. Moreover, when the user takes a video with the lens position and the user's line of sight being substantially at the same height, the user can take a video while checking the subject whose view is not blocked by the monitor unit 141.

(4) The camcorder 100 includes a lock mechanism configured to restrict the slide of the display section 301 or to release the restriction of the slide of the display section 301 when the display section 301 moves to the extended position.

Then, when the monitor unit 141 is pulled out from the retracted position in the monitor accommodating section 137 to the extended position, the slide of the monitor unit 141 is restricted. The restriction of the slide of the monitor unit 141 can be released by pressing the lock button 187.

(5) The hinge unit 147 includes the steel ball 173; the slide unit 144 includes the hole 190 (190*a*, 190*b*, 190A, 190B) to engage with the steel ball 173; and the hole 190 and the steel ball 173 engage with each other when the monitor unit 141 is at the retracted position and when the monitor unit 141 is at the extended position.

Then, the user can know that the monitor unit 141 has been retracted or extended.

(6) The camcorder 100 further includes the detection section 210 for detecting that the display section 301 has moved to the extended position, and the controller 207 for controlling a display of an image on the display panel 161 depending on the detection result of the detection section 210.

Therefore, when retracted, where an image display on the display panel 161 is not needed, no image is displayed on the display panel 161, whereby it is possible to reduce the power consumption.

(7) In the camcorder 100, the main material of the slide piece 142 is polyacetal. A portion of the display section 301 to engage with the slide piece 142 is formed by ABS which is a different material from that of the slide piece 142.

Then, it is possible to reduce the sliding noise to be heard while the monitor unit 141 slides.

(8) The camcorder 100 further includes the manual operation ring 111 to be manually operated by the user, and the display section 301 is placed at a different position from that of the manual operation ring 111 in an optical axis direction of light incident upon an optical system.

Then, it is possible to ensure more space for the user to operate the manual operation ring 111, and it is easier for the user to operate the manual operation ring 111.

(Embodiment 2)

Referring to FIGS. 6 and 15 to 18, Embodiment 2 will now be described. Note that in the description of the camcorder according to Embodiment 2, substantially the same elements to those of the camcorder according to Embodiment 1 will not be described redundantly.

[2-1. Configuration]

[2-1-1. Configuration of Slide Monitor Unit]

As shown in FIG. 6, in the camcorder 100 according to Embodiment 1, the slide monitor unit 140 includes the monitor unit 141, the hinge unit 147, the slide piece 142, and the slide unit 144. In the camcorder 100 according to Embodiment 2, the slide monitor unit 140 includes the monitor unit 141, the hinge unit 147, and the slide unit 144. That is, the slide monitor unit 140 does not include the slide piece 142.

The monitor unit 141 includes the monitor groove 150 (150*a*, 150*b*) on both side surfaces thereof. The hinge unit 147 includes the hinge groove 151 (151*a*, 151*b*) on both side surfaces thereof. When the monitor unit 141 and the hinge unit 147 are coupled to each other, the monitor groove 150*a* forms a straight-line groove together with the hinge groove 151*a*. Similarly, the monitor groove 150*b* forms a straight-line groove together with the hinge groove 151*b*.

FIG. 17 is a diagram illustrating the slide mechanism of the monitor unit 141. Referring to FIG. 17, the slide mechanism of the monitor unit 141 will be described. FIG. 17A is a cross-sectional view showing a state where the rail 192 (192*a*, 192*b*) is fit in the accommodation case 145. FIG. 17B is a diagram illustrating the engagement relationship between the rib (155, 193) and the groove (150, 151, 154) when the monitor unit 141 is in the retracted position. FIG. 17C is a diagram illustrating the engagement relationship between the rib (155, 193) and the groove (150, 151, 154) when the monitor unit 141 is in the intermediate position between the retracted position and the extended position. FIG. 17D is a diagram illustrating the engagement relationship between the rib (155, 193) and the groove (150, 151, 154) when the monitor unit 141 is in the extended position.

The rail 192 (192*a*, 192*b*) includes the groove 154 (154*a*, 154*b*) along which the rectangular rib 155 (155*a*, 155*b*), which is formed on both side surfaces of the hinge unit 147, can slide. The rail 192 (192*a*, 192*b*) includes the rib 193 (193*a*, 193*b*) at a position on the side toward which the monitor unit 141 is pulled out.

The rib 193 (193*a*, 193*b*) of the rail 192 (192*a*, 192*b*) engages with the straight-line groove formed by the monitor unit 141 and the hinge unit 147 so that the monitor unit 141 and the hinge unit 147 can slide. The rectangular rib 155 (155*a*, 155*b*) slidably engages with the straight-line groove 154 (154*a*, 154*b*) of the rail 192.

As shown in FIG. 17B, when the monitor unit 141 is in the retracted position, the rectangular rib 155 (155*a*, 155*b*) is located at one end along the groove 154 (154*a*, 154*b*) that is opposite to the rib 193 (193*a*, 193*b*). Then, the monitor unit 141 is fully accommodated in the monitor accommodating section 137. The joint surface between the monitor unit 141 and the hinge unit 147 is not exposed to the outside.

Therefore, even if the user applies a force so as to rotate the monitor unit 141 with respect to the hinge unit 147, the monitor unit 141 will not rotate because the monitor groove 150 and the rib 193 are engaging with each other. That is, the rotation of the monitor unit 141 with respect to the hinge unit 147 is restricted.

As shown in FIG. 17D, when the monitor unit 141 is in the extended position, the rectangular rib 155 (155*a*, 155*b*) is located at one end along the groove 154 (154*a*, 154*b*) on the side of the rib 193 (193*a*, 193*b*). Then, the joint surface between the monitor unit 141 and the hinge unit 147 is exposed to the outside, and the monitor groove 150 and the rib 193 are disengaged from each other. Therefore, if the user applies a force so as to rotate the monitor unit 141 with respect to the hinge unit 147, the monitor unit 141 rotates with respect to the hinge unit 147.

[2-2. Operation]

[2-2-1. Sliding of Monitor Unit]

Referring to FIG. 17, the sliding of the monitor unit will now be described.

As shown in FIGS. 17B to 17D, the monitor unit 141 and the hinge unit 147 are slidably supported by the slide unit 144, and slide between the retracted position and the extended position. As the user pulls out the monitor unit 141 using the extension rib 166, the monitor unit 141 slides from the retracted position to the extended position.

[2-2-2. Rotation of Monitor Unit]

In the camcorder 100 according to Embodiment 2, the rotation axis of the monitor unit 141 is offset from the center line of the monitor unit 141 which is parallel to the slide direction, i.e., deviated from the center line by 10 mm, for example, as shown in FIG. 16. Thus, the in-use position of the monitor unit 141 to be assumed when the monitor unit 141 is rotated about the rotation axis deviated from the center line can be shifted up or down from the in-use position of the monitor unit 141 which would be assumed when the monitor unit 141 is rotated about the center line.

If the monitor unit 141 is configured so that the display panel 161 faces down when the monitor unit 141 is retracted, with the rotation axis of the monitor unit 141 being deviated from the center line by 10 mm, for example, in the forward direction as viewed from the opposite side to the subject (i.e., as viewed from the user), as shown in FIG. 15, the user can use the monitor unit 141 at a position farther away from the user. Since a sufficient distance is ensured between the user and the monitor unit 141, the user can easily check the display panel 161 while taking a video.

[2-2-3. Detection of Rotation of Monitor Unit]

The camcorder 100 of Embodiment 2 has the same mechanism for detecting the rotation of monitor unit 141 as shown in FIG. 18 as the camcorder 100 of Embodiment 1.

Therefore, a person standing on the side of the subject can view the image displayed on the display panel 161 of the monitor unit 141 in a correct up-down orientation.

[2-3. Advantageous Effects, Etc.]

(1) The camcorder 100 includes: the monitor unit 141 having the display panel 161; the hinge unit 147 provided at one end of the monitor unit 141; and the slide unit 144 having a space in which the monitor unit 141 and the hinge unit 147 can be accommodated, the slide unit 144 slidably supporting the monitor unit 141 and the hinge unit 147, wherein: the monitor unit 141 and the hinge unit 147 slide between a retracted position at which the monitor unit 141 and the hinge unit 147 are accommodated in the space of the slide unit 144 and an extended position to which the monitor unit 141 and the hinge unit 147 are pulled out from the slide unit 144; and the monitor unit 141 is rotatably supported by the hinge unit 147 so that the monitor unit 141 can rotate with respect to the hinge unit 147 about a rotation axis that is offset from a center line of the display panel 161 which is parallel to a slide direction of the monitor unit 141 and the hinge unit 147.

Thus, the monitor unit 141 and the hinge unit 147 are slidably supported by the slide unit 144, and slide between the retracted position and the extended position. The monitor unit 141 can be placed at a higher position when the monitor unit 141 is used, and therefore the user can more easily check the display panel 161 while taking a video.

Moreover, when the user takes a video with the lens position and the user's line of sight being substantially at the same height, the user can take a video while checking the subject whose view is not blocked by the monitor unit 141.

(2) The camcorder 100 further includes: the optical system 201; the image sensor 204 for generating an image capture signal based on the subject image formed through the optical system 201; and the signal processing section 206 for generating an image signal based on the image capture signal. The rotation axis is located on the subject side with respect to the center line of the display panel 161, and the display panel 161 is placed on the lower surface of the monitor unit 141.

Then, since a sufficient distance is ensured between the user and the monitor unit 141, the user can easily check the display panel 161 while taking a video.

(3) The camcorder 100 further includes the detection section 210 for detecting a rotational position of the monitor unit 141, and the controller 207 for controlling an up-down orientation of an image displayed on the display panel 161 according to the detection result of the detection section 210.

Then, a person standing on the side of the subject can view the image displayed on the display panel 161 of the monitor unit 141 in a correct up-down orientation.

[Embodiment 3]

Referring to FIG. 19, Embodiment 3 will now be described.

[3-1. Configuration]

Figure 19A:
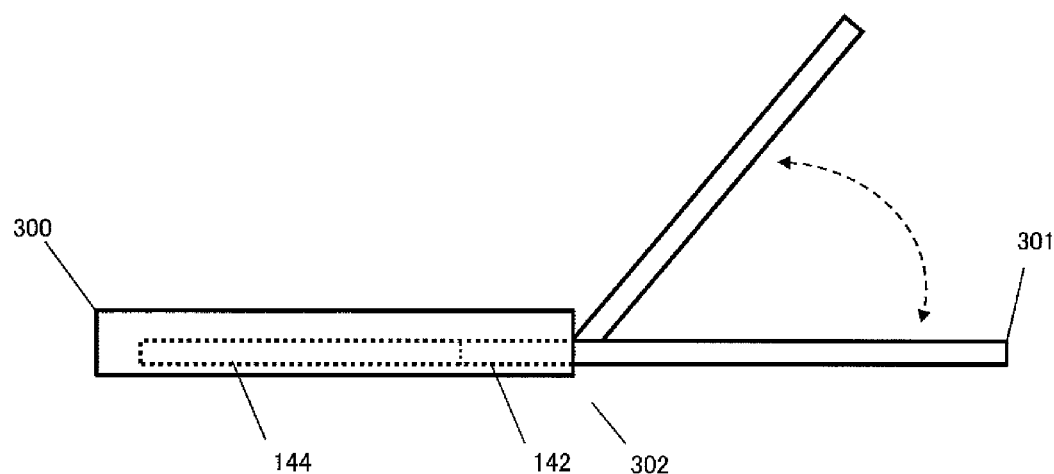
FIGS. 19A and 19B are diagrams illustrating a portable DVD player 302 having a monitor unit according to an exemplary Embodiment 3.
Figure 19B:
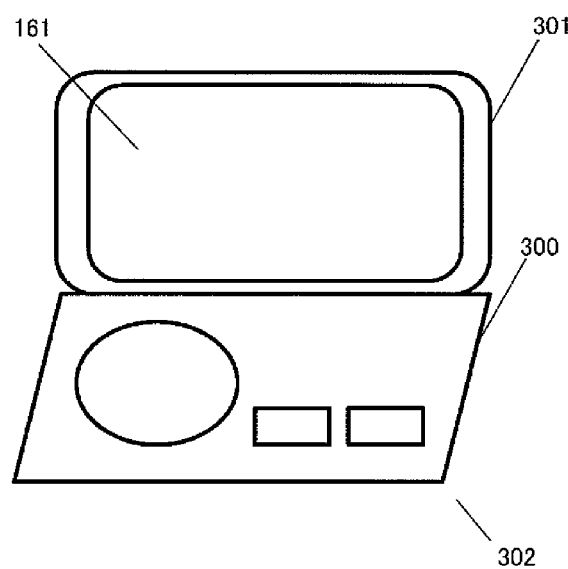

Embodiments 1 and 2 are directed to the camcorder 100 having a monitor unit. Embodiment 3 is directed to a portable DVD player 302 having a monitor unit. FIG. 19 is diagram illustrating the portable DVD player 302 having a monitor unit. FIG. 19A is a side view of the portable DVD player 302. FIG. 19B is an external view of the portable DVD player 302.

As shown in FIG. 19A, the portable DVD player 302 includes a main body 300, the display section 301, the slide unit 144, and the slide piece 142. The display section 301 includes the display panel 161.

[3-2. Operation]

As described above in Embodiments 1 and 2, the display section 301 slides between the extended position and the retracted position. When using the display section 301, the user pulls out the display section 301 to the extended position. When the display section 301 is not used, the display section 301 can be retracted to the retracted position.

[3-3. Advantageous Effects, Etc.]

The portable DVD player 302 includes the main body 300; the display section 301 having the display panel 161; the slide unit 144 having a space in which the display section 301 can be accommodated, the slide unit 144 slidably supporting the display section 301; and the slide piece 142 adjacent to the slide unit 144 in the slide direction of the display section 301, the slide piece 142 slidably supporting the display section 301, wherein the display section 301 slides between the retracted position at which the display section 301 is accommodated in the space of the slide unit 144 and the extended position to which the display section 301 is pulled out from the slide unit 144.

Then, even if the display panel 161 is provided on the lower surface of the display section 301, the display panel 161 will not be rubbed and scratched against the inner surface of the main body 300 when the display section 301 slides.

Moreover, it is possible to reduce the rattling up and down of the display section 301 when the display section 301 slides.

As with the camcorder 100 according to Embodiment 1, the display section 301 may include the hinge unit 147. In such a case, as shown in FIG. 19A, the user can position the display panel 161 so that it is easy for the user to view the display panel 161 by adjusting the angle of the display section 301.

[4. Other Embodiments]

Embodiments 1 to 3 have been described above as examples of the technique disclosed herein. However, the technique of this disclosure is not limited thereto, but is also applicable to other embodiments in which changes, replacements, additions, omissions, etc., are made as necessary. Different ones of the elements described in Embodiments 1 to 3 above may be combined together to obtain a new embodiment.

In view to this, other embodiments are illustrated hereinbelow.

In the camcorder 100 according to Embodiment 1, the monitor unit 141 slides as the user pulls out the monitor unit 141 using the extension rib 166, but the present disclosure is not limited thereto.

For example, a bias means (e.g., a spring) for biasing the monitor unit 141 toward the in-use state (extended position) may be provided on a side surface of the monitor unit 141 that opposes the exposed surface on which the extension rib 166 is provided, wherein the user can press the exposed surface of the monitor unit 141 so as to slide the monitor unit 141 into the in-use state (extended position) by virtue of the biasing force of the bias means.

While the camcorder 100 according to Embodiment 1 is configured so that the monitor unit 141 is accommodated in the monitor accommodating section 137 having a box shape, the present disclosure is not limited thereto.

For example, the camcorder 100 may be configured so that the monitor unit 141 is not accommodated in the monitor accommodating section 137 as long as the display panel 161 can be transitioned between the in-use state and the not-in-use state. That is, the camcorder 100 may be configured so that the monitor unit 141 is not accommodated in a housing, but is exposed to the outside.

In such a case, the shape of the slide piece 142 may be a rectangular shape of which one side is absent as shown in FIG. 7B. The slide piece 142 may be provided in the camcorder 100 in the opposite up-down orientation to that shown in FIG. 7B.

Note however that by accommodating the monitor unit 141 in the monitor accommodating section 137 having a box shape, it is possible to protect the display panel 161 from damages and dust from outside, for example.

In order to realize the slide movement, the camcorder 100 according to Embodiment 1 is configured so that the groove 153 of the slide piece 142 and the groove 154 of the rail 192 together form a continuous straight-line groove so that the rectangular rib 155 of the hinge unit 147 slides along the groove.

It is also configured so that the monitor groove 150 of the monitor unit 141 and the hinge groove 151 of the hinge unit 147 together form a continuous straight-line groove so that the rib 152 of the slide piece 142 slides along the groove.

However, the present disclosure is not limited to these configurations. That is, the camcorder 100 may be configured so that instead of a single groove formed by a combination of the monitor unit 141 and the hinge unit 147, separate grooves may be formed in these units so that corresponding ribs slide along these grooves.

Nevertheless, with the configuration where a rib slides along a groove formed by a combination of the monitor unit 141 and the hinge unit 147, one unit can rotate with respect to the other unit.

With the camcorder 100 according to Embodiment 1, the in-use state and the not-in-use state are associated respectively to a state where an image is displayed on the display panel 161 and another state where no image is displayed on the display panel 161. However, the present disclosure is not limited thereto.

For example, the in-use state and the not-in-use state may be associated respectively to a state where the display panel 161 of the monitor unit 141 is exposed to the outside and another state where the display panel 161 of the monitor unit 141 is not exposed to the outside.

With the camcorder 100 according to Embodiment 1, the slide frame 189 includes the hole 190 (190a, 190b, 190A, 190B) provided at two (front and rear) positions on each side (a total of four positions) on the upper surface.

However, the present disclosure is not limited thereto. For example, in the slide frame 189, an engagement hole A between the holes 190a and 190b is provided instead of the holes 190a and 190b, and an engagement hole B between the holes 190A and 190B is provided instead of the holes 190A and 190B. In the hinge unit 147, a protruding portion to engage with the engagement holes A and B is provided between the steel ball 173a and the steel ball 173b instead of the steel ball 173a and the steel ball 173b. The protruding portion may engage with the engagement hole A or B when the monitor unit 141 is in the retracted position or the extended position, respectively.

Also with such a configuration, locking occurs and a vibration is transmitted to the user, whereby the user can know that the monitor unit 141 has been retracted and extended.

Conversely, a protruding portion may be provided on the slide frame 189 and an engagement hole may be provided in the hinge unit 147.

Also with such a configuration, locking occurs and a vibration is transmitted to the user, whereby the user can know that the monitor unit 141 has been retracted and extended.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is applicable, for example, to electronic devices, including digital still cameras, camcorders, portable DVD players, and recorded medium reproduction devices.

This application is based on Japanese Patent Applications No. 2011-181247 filed on Aug. 23, 2011 and No. 2012-175520 filed on Aug. 8, 2012, the entire contents of which are hereby incorporated by reference.

What is claimed is:

1. An electronic device comprising:
    a display section including a monitor unit having a display panel;
    a slide unit having a space in which a portion of the display section can be accommodated, the slide unit slidably supporting the display section at at least two points; and
    a slide piece adjacent to the slide unit in a slide direction of the display section, the slide piece having a space in which a remainder of the display section can be accommodated and the slide piece slidably supporting the display section at at least two points,
    wherein the display section slides between a retracted position at which the display section is accommodated in the space of the slide unit and an extended position to which the display section is pulled out from the slide unit.

2. The electronic device according to claim 1, wherein:
    the display section further includes a rotation mechanism unit provided at one end of the monitor unit;

the slide unit slidably supports the rotation mechanism unit in the display section; and the slide piece slidably supports at least one of the monitor unit and the rotation mechanism unit.

3. The electronic device according to claim 2, wherein the monitor unit is rotatably supported by the rotation mechanism unit so that the monitor unit can rotate with respect to the rotation mechanism unit about a rotation axis that is offset from a center line of the display panel which is parallel to the slide direction.

4. The electronic device according to claim 2, wherein:

the rotation mechanism unit includes one of an engagement hole and a protruding portion to engage with the engagement hole, and the slide unit includes the other of the engagement hole and the protruding portion to engage with the engagement hole; and the engagement hole and the protruding portion engage with each other in at least one of the retracted position and the extended position.

5. The electronic device according to claim 1, further comprising a lock mechanism configured to restrict slide of the display section or to release the restriction of the slide of the display section when the display section moves to the extended position.

6. The electronic device according to claim 1, further comprising a detection section configured to detect that the display section has moved to the extended position, and a controller section configured to control a display of an image on the display panel depending on a detection result of the detection section.

7. The electronic device according to claim 1, wherein a main material of the slide piece is polyacetal.

8. The electronic device according to claim 1, wherein a portion of the display section to engage with the slide piece is formed by a different material from that of the slide piece.

9. The electronic device according to claim 8, further comprising:

an optical system;

an image sensor configured to generate an image capture signal based on a subject image formed through the optical system; and an image processing section configured to generate an image signal based on the image capture signal.

10. The electronic device according to claim 9, further comprising an operating section to be manually operated by a user, wherein the display section is placed at a different position from that of the operating section in an optical axis direction of light incident upon the optical system.

11. The electronic device according to claim 1, further comprising:

a rotation mechanism unit configured to rotatably support the monitor unit;

a detection section configured to detect a rotational position of the monitor unit; and a controller section configured to control an up-down orientation of an image displayed on the display panel according to a detection result of the detection section.

12. The electronic device according to claim 1, wherein the slide unit is formed integrally with the slide piece; and the slide unit and the slide piece support the display section at at least four points.

* * * * *